United States Patent
Baliga et al.

(10) Patent No.: US 8,614,956 B2
(45) Date of Patent: Dec. 24, 2013

(54) PLACEMENT OF WIRELESS REPEATERS IN A WIRELESS COMMUNICATION NETWORK

(75) Inventors: Roshan R Baliga, Bangalore (IN); Purushotham Kamath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/045,166

(22) Filed: Mar. 10, 2011

(65) Prior Publication Data

US 2012/0230206 A1     Sep. 13, 2012

(51) Int. Cl.
H04L 12/26     (2006.01)

(52) U.S. Cl.
USPC ........ 370/243; 709/209; 370/338; 455/452.2; 455/15; 455/3.01

(58) Field of Classification Search
USPC ........... 370/315, 252, 243, 331, 350, 25, 328, 370/335; 455/452.2, 15, 10, 402, 456.5
See application file for complete search history.

(56) References Cited

U.S. PATENT DOCUMENTS

| | | |
|---|---|---|
| 2005/0195975 A1 | 9/2005 | Kawakita |
| 2006/0268728 A1* | 11/2006 | Mower et al. ............ 370/252 |
| 2007/0008889 A1* | 1/2007 | Seo .............. 370/232 |
| 2007/0147338 A1* | 6/2007 | Chandra et al. .......... 370/350 |
| 2007/0177581 A1 | 8/2007 | Rodgers et al. |
| 2008/0057973 A1 | 3/2008 | Park |
| 2008/0132166 A1* | 6/2008 | Park et al. ............ 455/15 |
| 2009/0089863 A1 | 4/2009 | Vanniarajan |
| 2009/0116402 A1* | 5/2009 | Yamasaki .......... 370/253 |
| 2009/0168687 A1 | 7/2009 | Li et al. |
| 2009/0303880 A1 | 12/2009 | Maltz et al. |
| 2010/0046417 A1 | 2/2010 | Tamura |
| 2010/0054215 A1 | 3/2010 | Stahl et al. |
| 2010/0128622 A1 | 5/2010 | Horiuchi et al. |

(Continued)

FOREIGN PATENT DOCUMENTS

| | | |
|---|---|---|
| CN | 101562863 A | 10/2009 |
| EP | 2059059 A1 | 5/2009 |

(Continued)

OTHER PUBLICATIONS

International Search Report and Written Opinion—PCT/US2012/028646—ISA/EPO—Sep. 20, 2012.

(Continued)

*Primary Examiner* — Raj Jain
*Assistant Examiner* — Jamaal Henson
(74) *Attorney, Agent, or Firm* — DeLizio Gilliam, PLLC

(57) ABSTRACT

The position of wireless repeaters within a wireless communication network can affect the throughput and performance of the wireless communication network. A wireless repeater and/or an access point associated with the wireless communication network can be configured to determine the optimal position of the wireless repeater based on throughput achieved on communication links between the access point, the repeater, and/or the client stations. The throughput achieved on communication links between the access point, the repeater, and/or the client stations can be determined by exchanging training packets, receiving acknowledgement messages in response to the training packets, and subsequently analyzing the received acknowledgement messages. Furthermore, the throughput achieved on communication links between the access point, the repeater, and/or the client stations can also be analyzed to determine whether each of the client stations should associate with the access point or the wireless repeater.

25 Claims, 10 Drawing Sheets

(56) References Cited

U.S. PATENT DOCUMENTS

| | | | |
|---|---|---|---|
| 2011/0007692 | A1 | 1/2011 | Seok |
| 2011/0029664 | A1 | 2/2011 | Harrang et al. |
| 2011/0110345 | A1* | 5/2011 | Heidari et al. ............... 370/338 |
| 2011/0199919 | A1* | 8/2011 | Lin et al. ...................... 370/252 |
| 2012/0057462 | A1 | 3/2012 | Kotecha et al. |
| 2012/0215834 | A1 | 8/2012 | Chen et al. |
| 2012/0271902 | A1 | 10/2012 | Baliga et al. |

FOREIGN PATENT DOCUMENTS

| | | |
|---|---|---|
| WO | 2010045971 A1 | 4/2010 |
| WO | 2012122366 | 9/2012 |
| WO | 2012122550 | 9/2012 |
| WO | 2012145560 | 10/2012 |

OTHER PUBLICATIONS

International Search Report and Written Opinion—PCT/US2012/034322—ISA/EPO—Sep. 14, 2012.
Partial International Search Report—PCT/US2012/028646—ISA/EPO—Jun. 12, 2012.
"U.S. Appl. No. 13/090,784 Final Office Action", Jul. 23, 2013, 16 pages.
"PCT Application No. PCT/US2012/028646 International Preliminary Report on Patentability", Apr. 18, 2013, 11 pages.
"PCT Application No. PCT/US2012/034322 International Preliminary Report on Patentability", Mar. 27, 2013, 9 pages.
"PCT/US2012/028646 Written Opinion of the International Preliminary Examining Authority", Feb. 7, 2013, 10 pages.
"U.S. Appl. No. 13/090,784 Non Final Office Action", Dec. 7, 2012, 14 Pages.

* cited by examiner

PLACEMENT OF WIRELESS REPEATERS IN A WIRELESS COMMUNICATION NETWORK

BACKGROUND

Embodiments of the inventive subject matter generally relate to the field of wireless communication networks and, more particularly, to a mechanism for placement of wireless repeaters in a wireless communication network.

Wireless repeaters are typically deployed for extending the communication range of an access point (or a gateway) in a wireless communication network. The position of the wireless repeater within the wireless communication network (e.g., horizontal position of the wireless repeater, height at which a wireless repeater is placed, an orientation of the wireless repeater relative to client stations in the wireless communication network, antenna orientation, etc.) can impact whether a communication link between the access point and the client stations can be established via the wireless repeater, whether performance requirements can be met, and how much communication bandwidth is available at the client stations.

SUMMARY

Various embodiments of a mechanism for placement of wireless repeaters in a wireless communication network are disclosed. In one embodiment, a throughput associated with a communication link between a wireless repeater and an access point associated with a wireless communication network is determined. For each of one or more client stations associated with the wireless communication network, a throughput associated with a communication link between the wireless repeater and the client station is determined. For each of the one or more client stations, a cumulative throughput of a communication link between the access point and the client station via the wireless repeater is determined based on the throughput associated with the communication link between the wireless repeater and the access point, and based on the throughput associated with the communication link between the wireless repeater and the client station. It is determined, for each of the one or more client stations, whether the cumulative throughput is greater than or equal to a predetermined throughput threshold. Success of a current position of the wireless repeater with respect to the client station is indicated, in response to determining that the cumulative throughput is greater than or equal to the predetermined throughput threshold. Failure of the current position of the wireless repeater with respect to the client station is indicated, in response to determining that the cumulative throughput is less than the predetermined throughput threshold.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
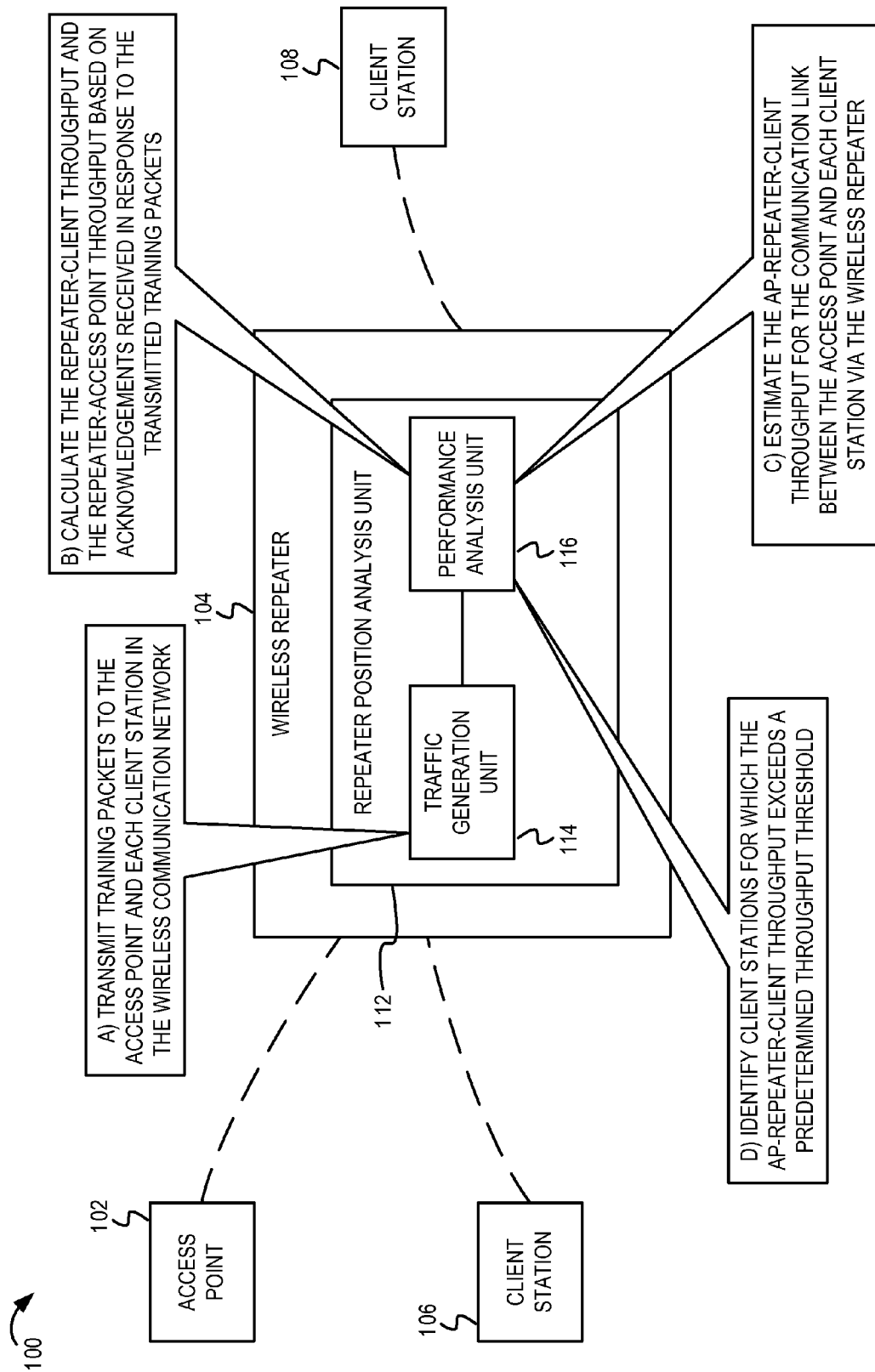
FIG. 1 is an example conceptual diagram illustrating operations of a wireless repeater configured for analyzing the position of the wireless repeater in a wireless communication network.

The description that follows includes exemplary systems, methods, techniques, instruction sequences, and computer program products that embody techniques of the present inventive subject matter. However, it is understood that the described embodiments may be practiced without these specific details. For instance, although examples refer to analyzing the current position of a wireless repeater in a wireless local area network (WLAN), embodiments are not so limited. In other embodiments, the operations for analyzing the current position of a wireless repeater can be implemented using other wireless communication standards and devices (e.g., Worldwide Interoperability for Microwave Access (WiMAX)). In other instances, well-known instruction instances, protocols, structures, and techniques have not been shown in detail in order not to obfuscate the description.

Traditionally, mechanisms for determining the position of a wireless repeater in a wireless communication network have relied on the received signal strength indicator (RSSI) associated with signals received at the wireless repeater. However, traditional mechanisms for determining the position of the wireless repeater may be unable to accurately estimate the communication bandwidth available to a client station when the wireless repeater is at a particular position. Consequently, the traditional mechanisms may be unable to determine whether the available bandwidth can support certain communications (e.g., transfer of video packets) from the access point to the client station. Furthermore, in some implementations, the client station may attempt to associate with the wireless repeater even if the RSSI associated with a signal received from the wireless repeater only marginally exceeds the RSSI associated with a signal received from the access point, which may result in a sub-optimal association scenario.

In other words, the traditional mechanisms for determining the position of the wireless repeater cannot control whether the client station should associate with the access point or with the wireless repeater. Therefore, in these scenarios, the communication bandwidth available to (and consequently the performance of) the client station when the client station associates with the wireless repeater may be much lower than the communication bandwidth available to (and consequently the performance of) the client station when the client station directly associates with the access point.

A repeater position analysis unit can be implemented on the wireless repeater and/or on the access point to determine an optimal position of the wireless repeater by taking into consideration various performance requirements (e.g., bandwidth and throughput requirements) associated with the client stations. The repeater position analysis unit can analyze the current position of the wireless repeater based on the throughput achieved on communication links between the access point, the repeater, and/or the client stations. In one embodiment, the wireless repeater can measure the throughput associated with communication links between the wireless repeater and the access point, and between the wireless repeater and the client stations, without assistance from the access point. The wireless repeater can then determine the suitability of the current position of the wireless repeater. In another embodiment, the access point in conjunction with the wireless repeater can determine the suitability of the current position of the wireless repeater based on the throughput associated with communication links between the access point and the wireless repeater, between the access point and the client stations, and between the wireless repeater and the client stations. Such a mechanism for determining the suitability of the current position of the wireless repeater can enable bandwidth, throughput, and other performance measurements to be estimated more accurately and can improve the performance of the wireless communication network. Furthermore, the access point in conjunction with the wireless repeater can determine whether each of the client stations should associate with the access point or with the wireless repeater, which may result in detection and reduction of suboptimal associations in the wireless communication network.

FIG. 1 is an example conceptual diagram illustrating operations of a wireless repeater configured for analyzing the position of the wireless repeater in a wireless communication network 100. The wireless communication network 100 comprises an access point 102, a wireless repeater 104, a client station 106, and a client station 108. The wireless repeater 104 comprises a repeater position analysis unit 112. The repeater position analysis unit 112 comprises a traffic generation unit 114 and a performance analysis unit 116. In one implementation, the access point 102, the wireless repeater 104, and the client stations 106 and 108 may be a wireless local area network (WLAN) access point, a WLAN repeater, and WLAN client stations, respectively. In one implementation, the wireless communication network 100 can be employed for applications (e.g., video over wireless (VoW) applications) that are expected to meet certain predetermined performance requirements (e.g., a target bandwidth). In FIG. 1 (and as will subsequently be described in FIGS. 3-4), the access point 102 may not comprise functionality for determining throughput and/or for analyzing the current position of the wireless repeater 104. The wireless repeater 104 can itself execute operations for estimating the throughput of the wireless communication link between the access point 102 and the client stations 106 and 108 via the wireless repeater 104, as will be described below with reference to stages A-D.

At stage A, the traffic generation unit 114 generates and transmits training packets to the access point 102 and to each client station 106 and 108 in the wireless communication network 100. In one implementation, the training packets can comprise a predetermined data sequence encapsulated by suitable WLAN packet headers. It is noted, however, that in other implementation the training packets may be formed differently; for example, the training packets can comprise randomly generated data encapsulated by the WLAN packet headers. In some implementations, the traffic generation unit 114 may transmit one training packet to the access point 102, the client station 106, and the client station 108. In another implementation, the traffic generation unit 114 may transmit (across a predetermined number of time intervals) any suitable number of packets to the access point 102, the client station 106, and the client station 108. In response to the training packets, the traffic generation unit 114 can receive one or more acknowledgement messages from the access point 102, the client station 106, and the client station 108.

At stage B, the performance analysis unit 116 calculates the throughput associated with the wireless communication link between the wireless repeater 104 and each client station 106 and 108 ("repeater-client throughput") and the throughput associated with the wireless communication link between the wireless repeater 104 and the access point 102 ("repeater-AP throughput") based on the acknowledgement messages received at stage A. As will be described with reference to blocks 314-316 of FIGS. 3-4, the performance analysis unit 116 can determine one or more performance measurements (e.g., packet error rate or PER) associated with the acknowledgment messages received from the access point 102, the client station 106, and the client station 108. Based on these performance measurements, the performance analysis unit 116 can then calculate the repeater-AP throughput and the repeater-client throughputs.

At stage C, the performance analysis unit 116 estimates the throughput associated with the wireless communication link between the access point 102 and each client station 106 and 108 via the wireless repeater 104 ("AP-repeater-client throughput"). As will be described with reference to block 318 of FIG. 4, the performance analysis unit 116 can estimate the AP-repeater-client throughput for each of the client stations 106 and 108 based on the repeater-AP throughput and the repeater-client throughputs determined at stage B. The AP-repeater-client throughput for a particular client station is based on the repeater-AP throughput and the repeater-client throughput for the particular client station and may be referred to as a cumulative throughput.

At stage D, the performance analysis unit 116 identifies client stations for which the AP-repeater-client throughput exceeds a predetermined throughput threshold. As will be described below with reference to blocks 320-324 of FIG. 4, the performance analysis unit 116 can compare the AP-repeater-client throughput against a predetermined throughput threshold that is dependent, at least in part, on performance requirements associated with the client stations 106 and 108. The performance analysis unit 116 can identify client stations where the current position of the wireless repeater 104 satisfies the performance requirements associated with the client stations. For example, the performance analysis unit 116 may determine that the AP-repeater-client throughput associated with the client station 108 falls below the predetermined throughput threshold. Therefore, the performance analysis unit 116 can determine that the current position of the wireless repeater 104 does not satisfy the performance requirements associated with the client station 108. In some implementations, the wireless repeater 104 may be moved to a new position and the throughputs at the new position of the wireless repeater 104 may be analyzed to determine whether the new position of the wireless repeater 104 satisfies the performance requirements associated with the client stations 106 and 108.

Figure 2:
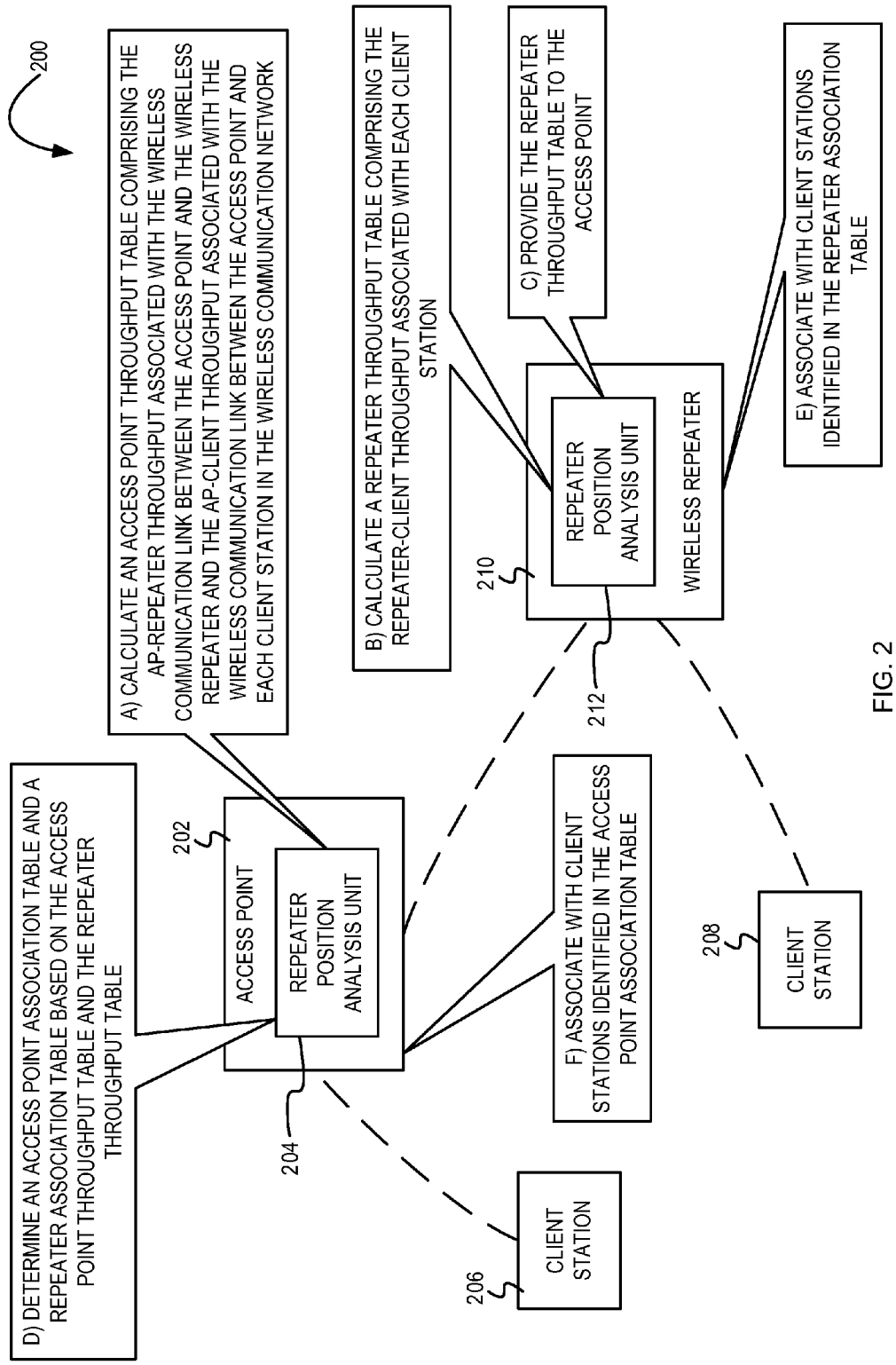
FIG. 2 is an example conceptual diagram illustrating operations of an access point configured for analyzing the position of a wireless repeater in a wireless communication network.

FIG. 2 is an example conceptual diagram illustrating operations of an access point configured for analyzing the position of a wireless repeater in a wireless communication network 200. The wireless communication network 200 comprises an access point 202, a wireless repeater 210, a client station 206, and a client station 208. The wireless repeater 210 comprises a repeater position analysis unit 212. The access point 202 also comprises a repeater position analysis unit 204. In one implementation, the repeater position analysis units 204 and 212 can each include a traffic generation unit and a performance analysis unit (similar to the repeater position analysis unit 112 of FIG. 1). In one implementation, the access point 202, the wireless repeater 210, and the client stations 206 and 208 may be a wireless local area network (WLAN) access point, a WLAN repeater, and WLAN client stations, respectively. In FIG. 2 (and as will subsequently be described in FIGS. 5-9), the access point 202 may comprise functionality for determining throughput and/or for analyzing the current position of the wireless repeater 104. The access point 202 in conjunction with the wireless repeater 210 can execute operations for analyzing the current position of the wireless repeater 210 and for determining whether the client stations 206 and 208 should connect to the access point 202 via a direct connection or via the wireless repeater 210, as will be described below with reference to stages A-F.

At stage A, the repeater position analysis unit 204 calculates an access point throughput table comprising the throughput associated with wireless communication links between the access point 202 and the wireless repeater 210 ("AP-repeater throughput"), and between the access point 202 and each client station 206 and 208 ("AP-client throughput") in the wireless communication network 200. As will be described with reference to blocks 502-510 of FIG. 5, the repeater position analysis unit 204 transmits training packets to the client stations 206 and 208 and to the wireless repeater 210, receives acknowledgement messages from the client stations 206 and 208 and the wireless repeater 210 in response to the training packets, determines performance measurements associated with the received acknowledgment messages, and determines the AP-repeater throughput and the AP-client throughputs based on the performance measurements. The repeater position analysis unit 204 can then store the AP-repeater throughput and the AP-client throughputs in the access point throughput table. After the access point throughput table is generated, the access point 202 can switch to a client mode and can cause the wireless repeater 210 to assume the role of the access point (i.e., switch to the access point mode) for measurement purposes in the wireless communication network 200.

At stage B, the repeater position analysis unit 212 of the wireless repeater 210 calculates a repeater throughput table comprising the repeater-client throughput associated with each of the client stations 206 and 208. As will be described with reference to blocks 312-316 of FIGS. 3-4 and with reference to blocks 708-714 of FIGS. 7-8, the repeater position analysis unit 212 transmits training packets to the client stations 206 and 208, receives acknowledgement messages from the client stations 206 and 208 in response to the training packets, determines performance measurements associated with the received acknowledgment messages, and determines the repeater-client throughput based on the performance measurements. The repeater position analysis unit 212 can then store the repeater-client throughputs in the repeater throughput table.

At stage C, the repeater position analysis unit 212 provides the repeater throughput table to the access point 202. Subsequently, the wireless repeater 210 can switch from the access point mode to the client mode, and the access point 202 can switch from the client mode to the access point mode.

At stage D, the repeater position analysis unit 204 determines an access point association table and a repeater association table based on the access point throughput table and the repeater throughput table. As will be described below with reference to blocks 516-526 of FIG. 6, the repeater position analysis unit 204 can calculate the AP-repeater-client throughput for each of the client stations 206 and 208 based on the access point throughput table and the repeater throughput table. For each of the client stations 206 and 208, the repeater position analysis unit 204 can determine whether a direct wireless communication link between the access point 202 and the client station yields better performance as compared to a 1-hop wireless communication link between the access point 202 and the client station via the wireless repeater 210. The access point association table can comprise a list of client stations where the AP-client throughput is better than the AP-repeater-client throughput. The repeater association table can comprise a list of client stations where the AP-repeater-client throughput is better than the AP-client throughput (e.g., by at least a predetermined percentage). The repeater position analysis unit 204 can also provide the repeater association table to the wireless repeater 210.

At stage E, the wireless repeater 210 switches from the client mode to a repeater mode and permits client stations identified in the repeater association table to associate with the wireless repeater 210. On receiving a control message (e.g., from the client station 206) to connect to the wireless repeater 210, the wireless repeater 210 can determine whether the client station 206 is listed in the repeater association table. If so, then on receiving an association request message from the client station 206, the wireless repeater 210 can transmit an association response message and can associate with the client station 206. If the client station 206 is not listed in the repeater association table, then on receiving an association request message from the client station 206, the wireless repeater 210 can transmit an association failed response. In other words, the wireless repeater 210 can prevent association with (or block) the client station 206 and therefore, effectively cause the client station 206 to associate with the access point 202.

At stage F, the access point 202 connects to and associates with client stations identified in the access point association table. On receiving a control message (e.g., from the client station 208) to connect to the access point 202, the access point 202 can determine whether the client station 208 is listed in the access point association table. If so, then on receiving an association request message from the client station 208, the access point 202 can transmit an association response message and can associate with the client station 208. If the client station 208 is not listed in the access point association table, then on receiving an association request message from the client station 208, the access point 202 can block the client station 208 and therefore, effectively cause the client station 208 to associate with the wireless repeater 210.

Figure 3:
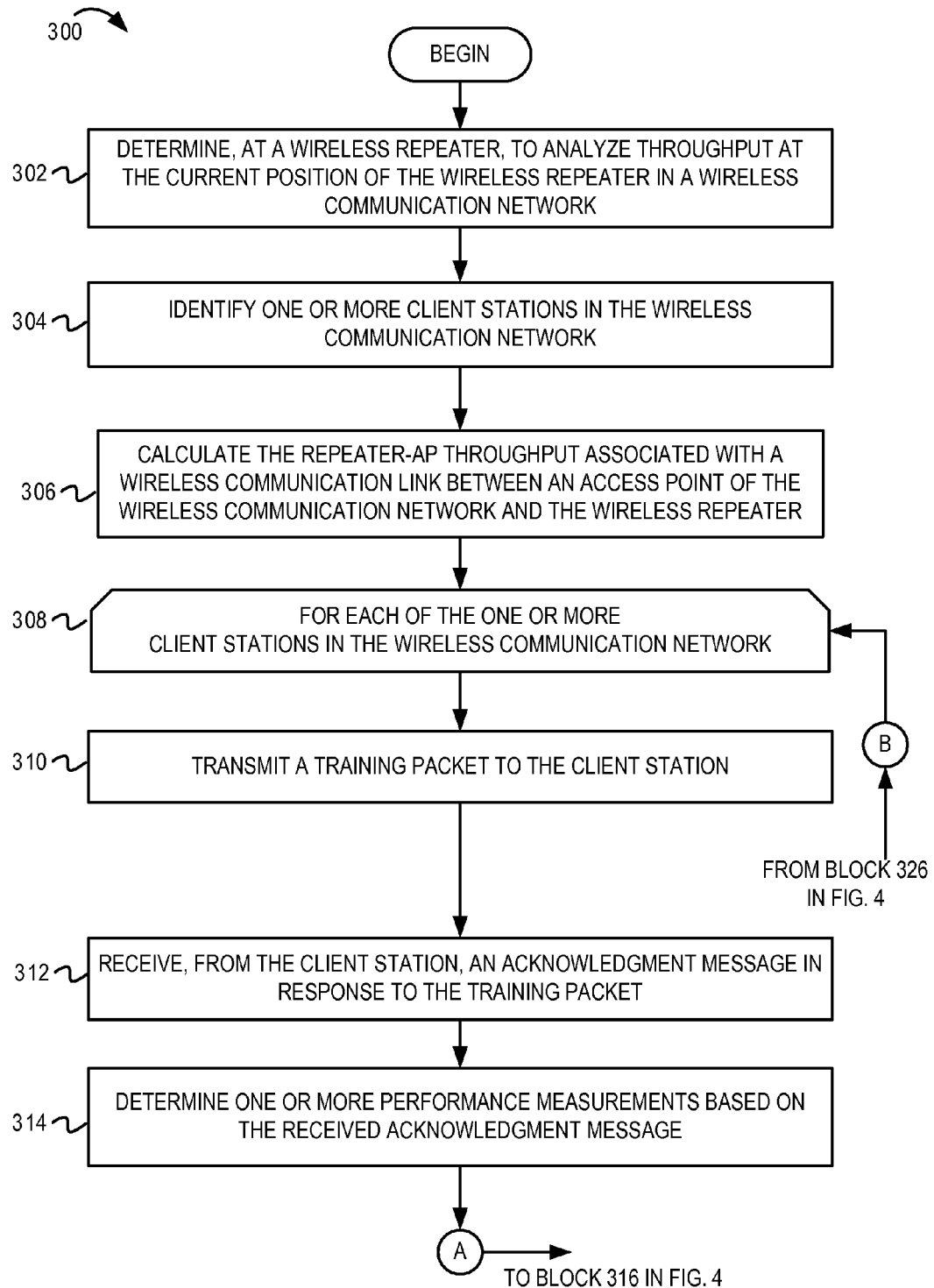
FIG. 3 is a flow diagram illustrating example operations of a wireless repeater configured to analyze the suitability of the position of the wireless repeater in a wireless communication network.
Figure 4:
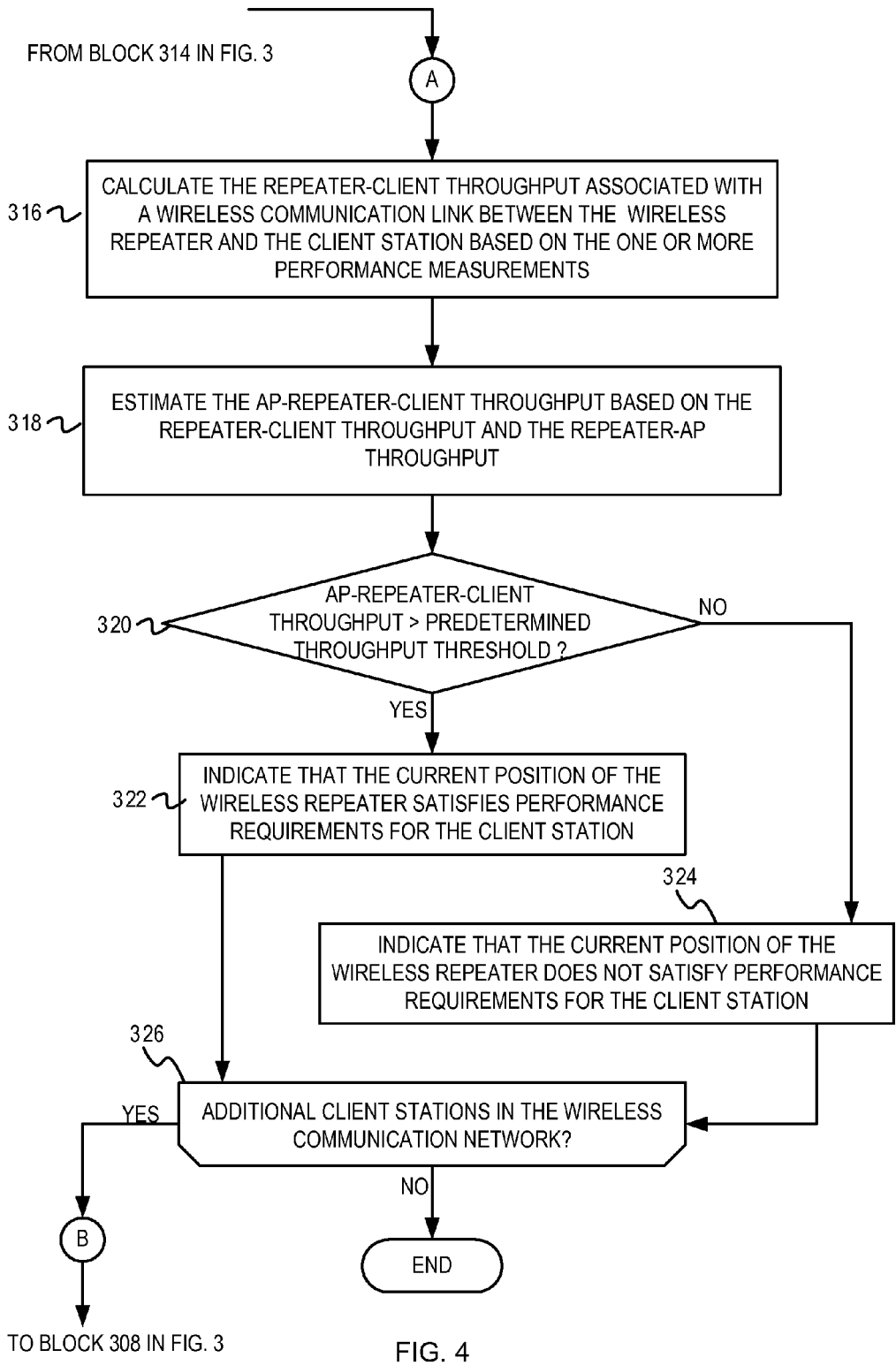
FIG. 4 is a continuation of FIG. 3 and also illustrates example operations of the wireless repeater configured to analyze the suitability of the position of the wireless repeater in the wireless communication network.

FIG. 3 and FIG. 4 depict a flow diagram ("flow") 300 illustrating example operations of a wireless repeater configured to analyze the suitability of the position of the wireless repeater in a wireless communication network. The flow 300 begins at block 302 in FIG. 3.

At block 302, a wireless repeater determines to analyze throughput at the current position of the wireless repeater in a wireless communication network. For example, with reference to FIG. 1, the repeater position analysis unit 112 of the wireless repeater 104 can determine to analyze the suitability of the current position of the wireless repeater 104 in the wireless communication network 100. In some implementations, the repeater position analysis unit 112 can analyze the suitability of the current position of the wireless repeater 104 in response to a trigger from a network administrator. In another implementation, the repeater position analysis unit 112 can analyze the suitability of the current position of the wireless repeater 104 at periodic intervals. In another implementation, the repeater position analysis unit 112 can analyze the suitability of the current position of the wireless repeater 104 in response to detecting (or receiving an indication of) performance degradation in the wireless communication network 100. In one implementation, the repeater position analysis unit 112 can be enabled in response to determining to analyze the suitability of the current position of the wireless repeater 104. The flow continues at block 304.

At block 304, one or more client stations in the wireless communication network are identified. For example, the repeater position analysis unit 112 can identify the client stations 106 and 108 in the wireless communication network 100. The repeater position analysis unit 112 can also identify the access point 102 associated with the wireless communication network 100. In one implementation, the network administrator may program information identifying the client stations 106 and 108 and the access point 102 in the repeater position analysis unit 112. In another implementation, the repeater position analysis unit 112 can automatically identify the client stations 106 and 108 and the access point 102. The flow continues at block 306.

At block 306, the repeater-AP throughput associated with a wireless communication link between the access point of the wireless communication network and the wireless repeater is calculated. For example, the repeater position analysis unit 112 can calculate the repeater-AP throughput. As will be described below with reference to blocks 310-316, to calculate the repeater-AP throughput, the traffic generation unit 114 can transmit one or more training packets to the access point 102 and receive acknowledgment messages (in response to the one or more training packets) from the access point 102. Based on performance measurements determined from the acknowledgment messages, the performance analysis unit 116 can calculate the repeater-AP throughput in accordance with Eq. 1 (described with reference to block 316). The flow continues at block 308.

At block 308, a loop begins for each of the one or more client stations in the wireless communication network. For example, the repeater position analysis unit 112 can initiate a loop to analyze each of the client stations 106 and 108 in the wireless communication network 100. As will be described below with reference to blocks 310-326, the repeater position analysis unit 112 can identify client stations at which the current position of the wireless repeater 104 satisfies performance requirements associated with the client stations. The flow continues at block 310.

At block 310, a training packet is transmitted to the client station. For example, the traffic generation unit 114 can transmit the training packet to the client station 106. In one implementation, the training packet can comprise predetermined data (e.g., a predetermined combination of zeros and ones). In another implementation, the traffic generation unit 114 can randomly generate (e.g., using a random number generator) the data to be transmitted within the training packet. The flow continues at block 312.

At block 312, an acknowledgment message is received from the client station in response to the training packet. For example, the traffic generation unit 114 can receive an acknowledgment message (e.g., an ACK packet, a block ACK packet, etc.) that indicates successful reception of the training packet at the client station 106. The flow continues at block 314.

At block 314, one or more performance measurements are determined based on the received acknowledgement message. For example, the performance analysis unit 116 can determine one or more performance measurements in response to receiving the acknowledgement message from the client station 106 (at block 312). In one implementation, the performance analysis unit 116 can determine a data communication rate (e.g., a physical layer (PHY) rate), a packet error rate (PER), a packet success rate, a number of overhead bits exchanged via the wireless communication link (i.e., a total number of overhead bits in the training packet and the acknowledgement message), and/or other performance measurements. The number of overhead bits can vary depending on the communication protocol implemented by the wireless repeater 104 and the client station 106. In one implementation, the performance analysis unit 116 may not determine the exact number of overhead bits exchanged via the wireless communication link between the wireless repeater 104 and the client station 106. Instead, the performance analysis unit 116 may estimate (or heuristically determine) a factor (k) that is proportional to the number of overhead bits exchanged via the wireless communication link between the wireless repeater 104 and the client station 106. The flow continues at block 316 in FIG. 4.

At block 316, the repeater-client throughput associated with the wireless communication link between the wireless repeater and the client station is calculated based on the one or more performance measurements. For example, the performance analysis unit 116 can determine the repeater-client throughput associated with the client station 106 based on the one or more performance measurements determined at block 314. In one implementation, the repeater-client throughput can be calculated as a product of the PHY rate, the packet success rate, and the number of overhead bits exchanged via the wireless communication link, as depicted with reference to Eq. 1. With reference to Eq. 1, k represents a scale factor that is proportional to the overhead associated with the communication protocol implemented at the wireless repeater 104 and at the client station 106. Also, the factor k*PHY rate represents the effective throughput achieved for a specified PHY rate.

$$\text{Througput} = k * \text{PHY rate} * (1 - \text{PER}) \qquad \text{Eq. 1}$$

It is noted that Eq. 1 is one example representation of the repeater-client throughput. It is noted that the repeater-AP throughput and the repeater-client throughput calculated based on the product of the PHY rate, the packet success rate, and the number of overhead bits exchanged via the wireless communication link (as depicted with reference to Eq. 1) may also be referred to as the repeater-AP goodput and the repeater-client goodput, respectively. In one example, goodput can be defined as a measure of useful bits exchanged via the wireless communication links, and which excludes dropped packets, packet retransmissions, and protocol overhead. In other implementations, the repeater-client throughput (and the repeater-AP throughput) can be calculated using any suitable combination of performance measurements and/or any suitable throughput (or goodput) estimation techniques. For example, in addition to the PHY rate, the PER, and the number of overhead bits, other performance measurements such as RSSI, error vector magnitude (EVM), etc. can also be taken into consideration in calculating the repeater-client throughput. In other embodiments, instead of calculating the repeater-client throughput, individual performance measurements (e.g., the PER) can be analyzed to quantify the position of the wireless repeater 104. In some implementations, the performance analysis unit 116 can also populate a repeater throughput table. The repeater throughput table can comprise identifying information (e.g., a network address and/or association ID) associated with the client station 106 and the corresponding repeater-client throughput. The performance analysis unit 116 can maintain the repeater throughput table in a file, a predetermined memory location, an external storage device, or other suitable storage locations. The flow continues at block 318.

At block 318, the AP-repeater-client throughput (referred to as cumulative throughput) is estimated based on the repeater-AP throughput and the repeater-client throughput. The AP-repeater-client throughput can be representative of the throughput associated with the wireless communication link between the access point 102 and the client station 102 via the wireless repeater 104. For example, the performance analysis unit 116 can estimate the AP-repeater-client throughput based on the repeater-AP throughput (determined at block 306) and the repeater-client throughput (determined at block 316). In some implementations, the performance analysis unit 116 can calculate the AP-repeater-client throughput in accordance with Eq. 2. In other implementations, the performance analysis unit 116 can calculate the AP-repeater-client throughput in accordance with Eq. 3, which is a simplified representation of Eq. 2. The flow continues at block 320.

$$AP\_repeater\_client\ througput = \frac{(repeater\_AP\ throughput) * (repeater\_client\ throughput)}{(repeater\_AP\ throughput) + (repeater\_client\ throughput)} \quad \text{Eq. 2}$$

$$AP\_repeater\_client\ througput = \frac{1}{2} * \min(repeater\_AP\ throughput,\ repeater\_client\ throughput) \quad \text{Eq. 3}$$

The AP-repeater-client throughput (i.e., cumulative throughput) may be estimated by a variety of ways. For example, shown in Eq. 2, the AP-repeater-client throughput may be determined by calculating a product of the throughput associated with the communication link between the wireless repeater and the access point and the throughput associated with the communication link between the wireless repeater and the client station; calculating a sum of the throughput associated with the communication link between the wireless repeater and the access point and the throughput associated with the communication link between the wireless repeater and the client station; and dividing the calculated product by the calculated sum to yield the cumulative throughput of the communication link between the access point and the client station via the wireless repeater. In the example, shown in Eq. 3, the AP-repeater client throughput may be determined by determining a minimum throughput value between the throughput associated with the communication link between the wireless repeater and the access point and the throughput associated with the communication link between the wireless repeater and the client station; and multiplying the determined minimum throughput value by a predetermined scale factor to yield the cumulative throughput of the communication link between the access point and the client station via the wireless repeater.

At block 320, it is determined whether the estimated AP-repeater-client throughput is greater than a predetermined throughput threshold. For example, the performance analysis unit 116 can determine whether the AP-repeater-client throughput (determined at block 318) is greater than the predetermined throughput threshold. In one implementation, the performance analysis unit 116 can calculate the predetermined throughput threshold based on throughput requirements associated with the wireless repeater 104, the access point 102, the client stations 106 and 108, and/or the wireless communication network 100. In some implementations, the predetermined throughput threshold is also configurable. If it is determined that the estimated AP-repeater-client throughput is greater than the predetermined throughput threshold, the flow continues at block 322. Otherwise, the flow continues at block 324.

At block 322, it is determined that the current position of the wireless repeater satisfies performance requirements for the client station. The flow 300 moves from block 320 to block 322 if the performance analysis unit 116 determines that the estimated AP-repeater-client throughput is greater than the predetermined throughput threshold. The AP-repeater-client throughput being greater than the predetermined throughput threshold can indicate that the wireless repeater 104 can satisfy the throughput requirements associated with the client station 106 when the wireless repeater 104 is at its current position. The performance analysis unit 116 can indicate success of the current position of the wireless repeater 104 with respect to the client station 106 using LEDs or a display unit. For example, the performance analysis unit 116 can switch on the LED associated with the client station 106 in response to determining that the wireless repeater 104 satisfies the performance requirements associated with the client station 106. As another example, the performance analysis unit 116 can present the address of the client station 106 and the AP-repeater-client throughput on the display unit (e.g., LCD display), and can indicate success of the current position of the wireless repeater 104 with respect to the client station 106 on the display unit. The flow continues at block 326.

At block 324, it is determined that the current position of the wireless repeater does not satisfy performance requirements for the client station. The flow 300 moves from block 320 to block 324 if the performance analysis unit 116 determines that the estimated AP-repeater-client throughput is less than the predetermined throughput threshold. The AP-repeater-client throughput being less than the predetermined throughput threshold can indicate that the wireless repeater 104 cannot satisfy the throughput requirements associated with the client station 108 when the wireless repeater 104 is at its current position. The performance analysis unit 116 can indicate failure of the current position of the wireless repeater 104 with respect to the client station 108 using LEDs or the display unit (similarly as was described above). For example, the performance analysis unit 116 may not switch on the LED associated with the client station 108, or may present a failure notification on the display unit (e.g., LCD display), in response to determining that the wireless repeater 104 does not satisfy the performance requirements associated with the client station 108. The flow continues at block 326.

At block 326, it is determined whether additional client stations in the wireless communication network are to be analyzed. For example, the performance analysis unit 116 can determine whether additional client stations are to be analyzed. If it is determined that there exist additional client stations in the wireless communication network 100 to be analyzed, the flow continues at block 308 in FIG. 3, where the next client station is identified and operations described above with reference to blocks 310-326 are executed for the next client station. Otherwise, the flow ends.

It is noted that although FIG. 3 depicts the traffic generation unit 114 transmitting one training packet to the access point 102 and to each of the client stations 106 and 108, embodiments are not so limited. In some implementations, the traffic generation unit 114 may transmit any suitable number of training packets during different time intervals and may receive one or more acknowledgement messages in response to the training packets. The performance analysis unit 116 may then determine the performance measurements based on the received one or more acknowledgement messages. Furthermore, although FIG. 3 depicts the traffic generation unit 114 successively transmitting the training packets to the access point 102 and to each of the client stations 106 and 108, embodiments are not so limited. In other embodiments, the traffic generation unit 114 may broadcast the training packets to all the wireless devices (e.g., the access point 102, the client station 106, and the client station 108) in the wireless communication network 100 simultaneously. The traffic generation unit 114 can then wait to receive (from each of the wireless devices) acknowledgement messages that indicate successful receipt of the broadcast training packet.

Figure 5:
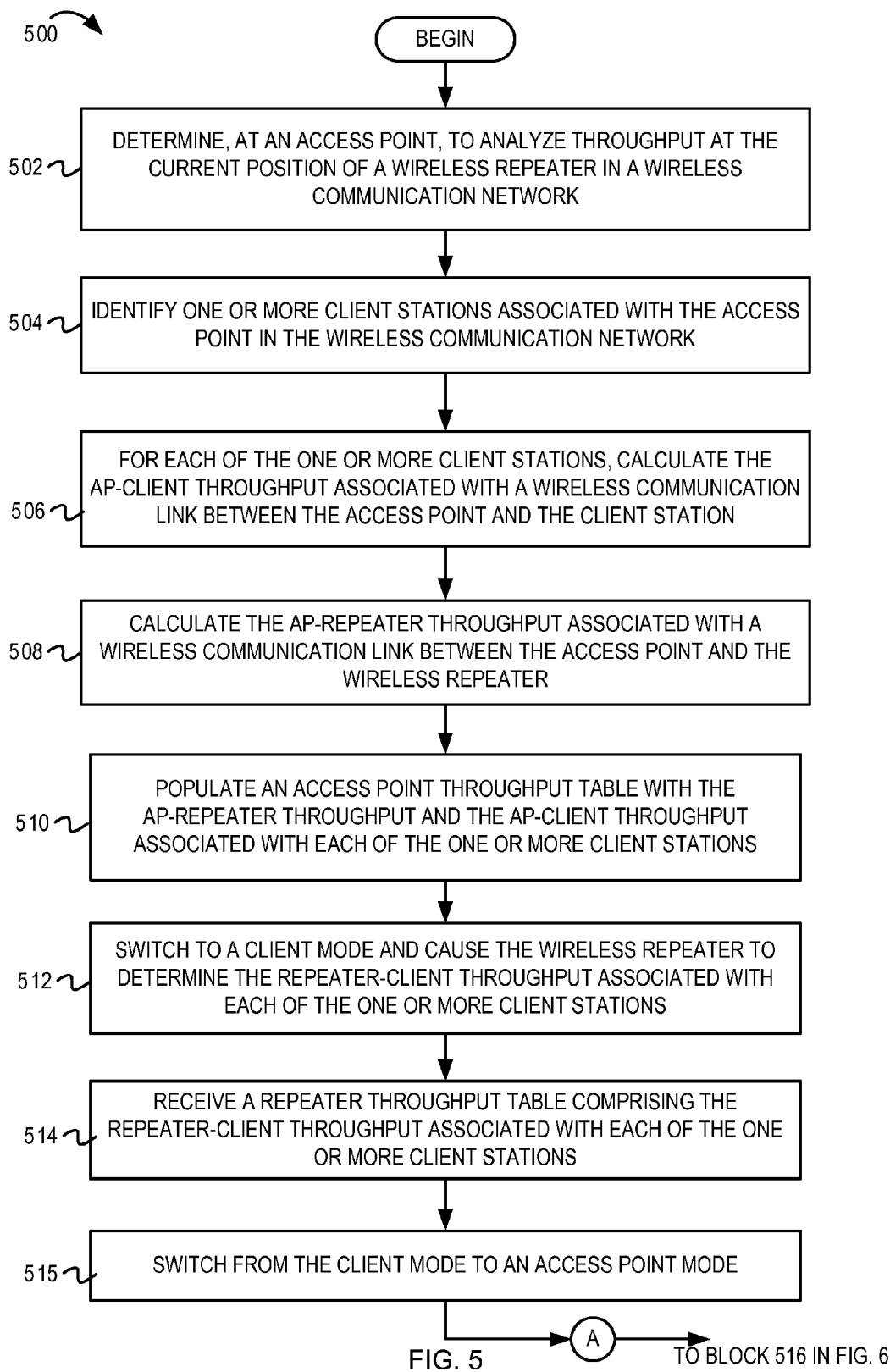
FIG. 5 is a flow diagram illustrating example operations of an access point configured to analyze the suitability of the position of a wireless repeater in a wireless communication network.
Figure 6:
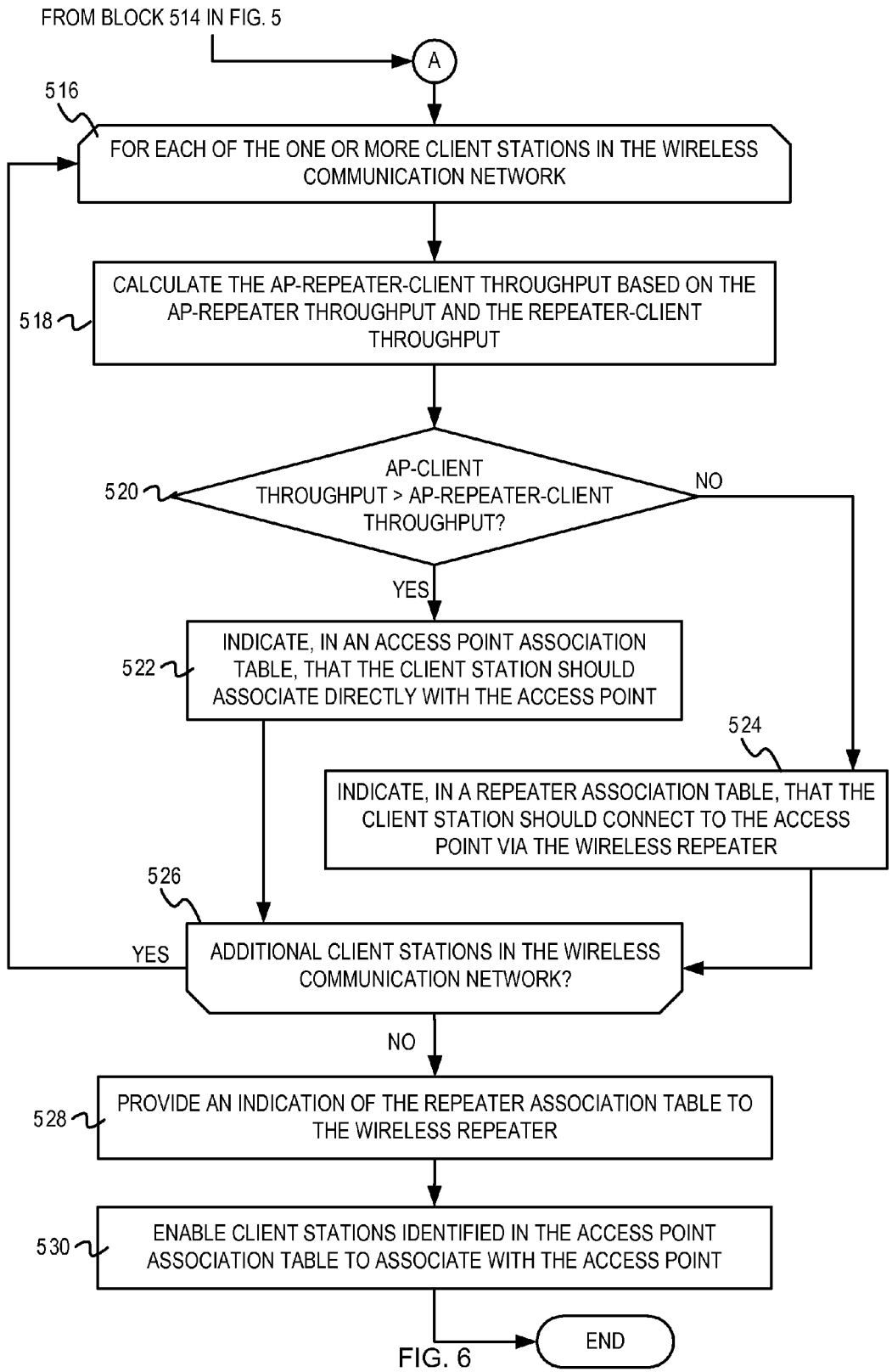
FIG. 6 is a continuation of FIG. 5 and also illustrates example operations of the access point configured to analyze the suitability of the position of a wireless repeater in a wireless communication network.
Figure 7:
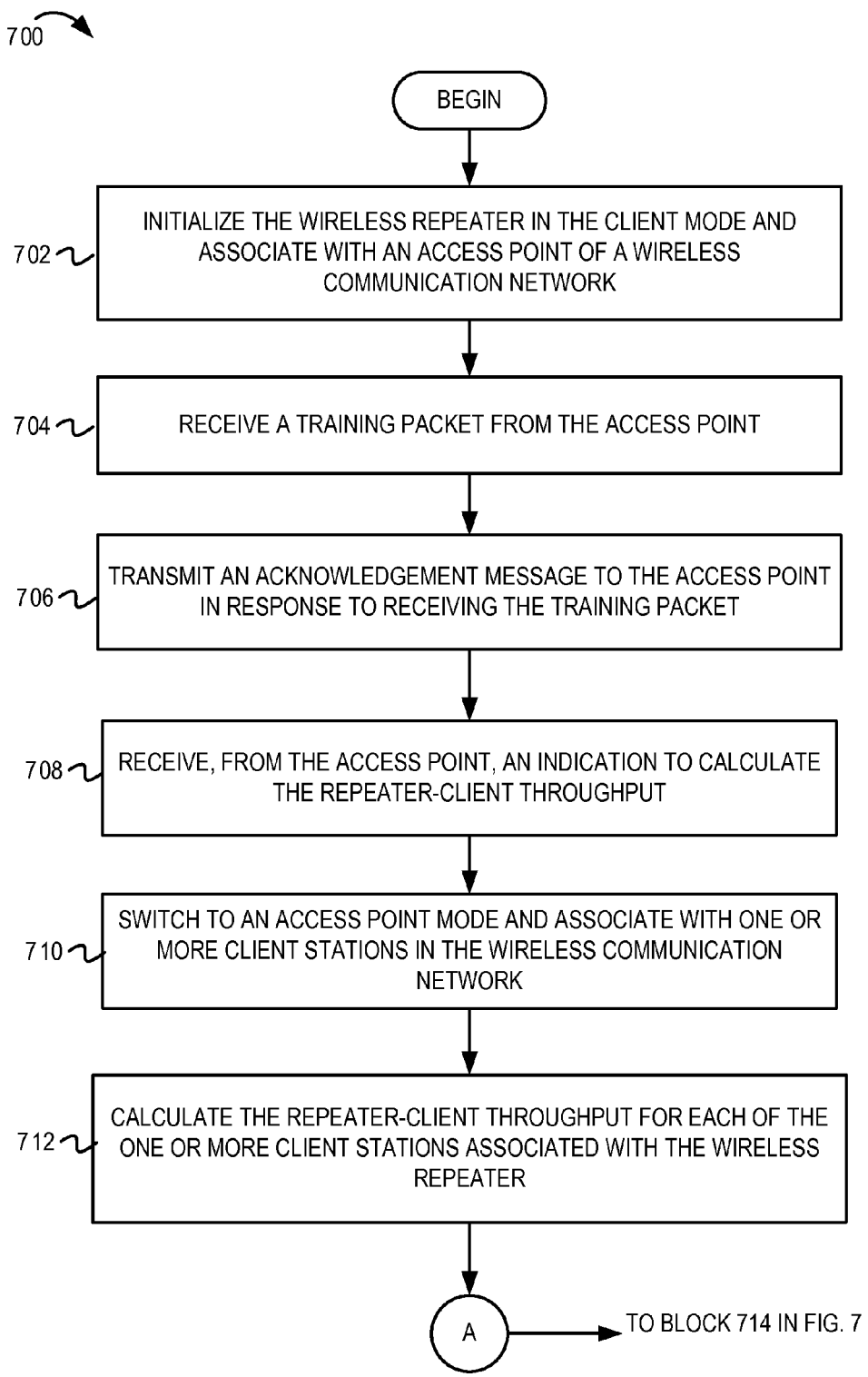
FIG. 7 is a flow diagram illustrating example operations of the wireless repeater that operates in conjunction with the access point for analyzing the suitability of the position of the wireless repeater in a wireless communication network.
Figure 8:
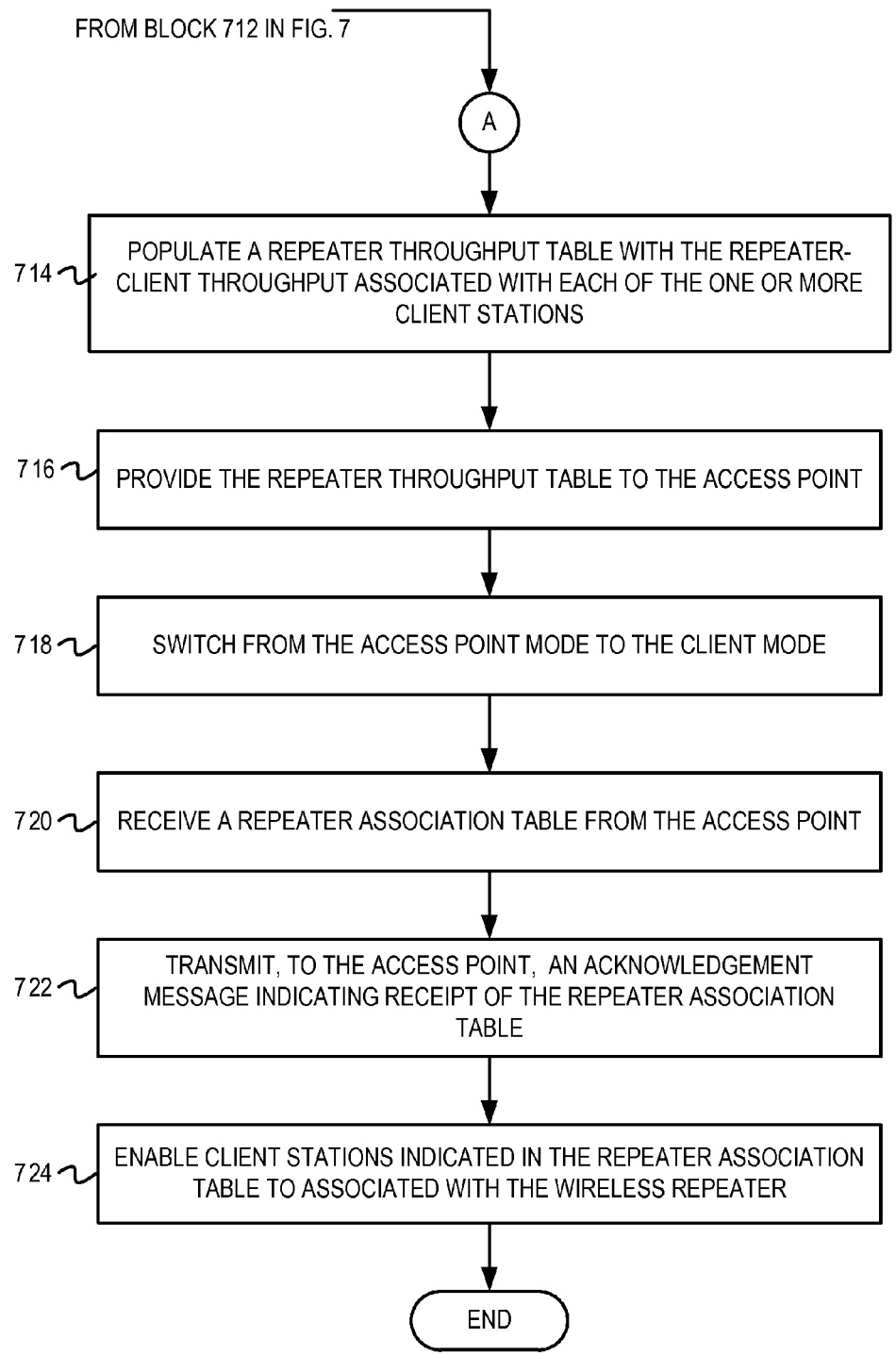
FIG. 8 is a continuation of FIG. 7 and also illustrates example operations of the wireless repeater that operates in conjunction with the access point for analyzing the suitability of the position of the wireless repeater in a wireless communication network.

In some implementations, as will be further described with reference to FIGS. 5-8, both the access point and the wireless repeater can be configured to implement functionality for analyzing the suitability of the current position of the wireless repeater. Such a mechanism can improve the accuracy associated with the analysis of the current position of the wireless repeater and can minimize sub-optimal associations. FIGS. 5-6 further describe operations of the access point implementing functionality for analyzing the throughputs at the current position of the wireless repeater. FIGS. 7-8 describe operations of the wireless repeater implementing functionality (when assisted by the access point) for analyzing the throughputs at the current position of the wireless repeater.

FIG. 5 and FIG. 6 depict a flow diagram 500 illustrating example operations of an access point configured to analyze the suitability of the position of a wireless repeater in a wireless communication network. The flow 500 begins at block 502 in FIG. 5.

At block 502, an access point determines to analyze the throughput at the current position of a wireless repeater in a wireless communication network. For example, with reference to FIG. 2, repeater position analysis unit 204 of the access point 202 can determine to the analyze the throughput at, and the suitability of, the current position of the wireless repeater 210 in the wireless communication network 200. The repeater position analysis unit 202 can determine to analyze the suitability of the current position of the wireless repeater 210 in response to a trigger from a network administrator, at periodic intervals, in response to detecting performance degradation in the wireless communication network 200, and/or based on other criteria. The flow continues at block 504.

At block 504, one or more client stations associated with the access point in the wireless communication network are identified. For example, the repeater position analysis unit 204 can identify the client stations 206 and 208 in the wireless communication network 200. Because the client stations 206 and 208 exchange control messages for connecting to and associating with the access point 202, the access point 202 can keep track of the client stations 206 and 208 with which it has established a wireless communication link. In some examples, the repeater position analysis unit 204 can access a predetermined memory location associated with the access point 202 where the client station information is stored, or can query an access point connection manager to determine the client stations 206 and 208 associated with the access point 202. The flow continues at block 506.

At block 506, for each of the one or more client stations, the AP-client throughput associated with a wireless communication link between the access point and the client station is calculated. For example, the repeater position analysis unit 204 of the access point 202 can calculate the AP-client throughput for each of the client stations 206 and 208 associated with the access point 202. As described above with reference to blocks 310-316 of FIGS. 3-4, the repeater position analysis unit 204 can transmit one or more training packets to the client stations 206 and 208. The repeater position analysis unit 204 can receive acknowledgement messages from the client stations 206 and 208 indicating successful reception of the training packets. The repeater position analysis unit 204 can determine performance measurements associated with the received acknowledgement messages and can calculate the AP-client throughput based on the performance measurements (e.g., using Eq. 1 shown above). In some implementations, if the repeater position analysis unit 204 determines multiple values of the AP-client throughput across multiple time intervals, the repeater position analysis unit 204 can calculate an average AP-client throughput. The flow continues at block 508.

At block 508, the AP-repeater throughput associated with a wireless communication link between the access point and the wireless repeater is calculated. For example, the repeater position analysis unit 204 can calculate the AP-repeater throughput associated with the wireless communication link between the access point 202 and the wireless repeater 210. As described above with reference to blocks 310-316 of FIGS. 3-4, the repeater position analysis unit 204 can transmit one or more training packets to the wireless repeater 210. The repeater position analysis unit 204 can receive acknowledgement messages from the wireless repeater 210 indicating successful receipt of the training packets. The repeater position analysis unit 204 can determine performance measurements associated with the received acknowledgement messages and can calculate the AP-repeater throughput (or an average AP-repeater throughput) based on the performance measurements (e.g., using Eq. 1 shown above). The flow continues at block 510.

At block 510, an access point throughput table comprising the AP-repeater throughput and the AP-client throughput associated with each of the one or more client stations is populated. For example, the repeater position analysis unit 204 can store the AP-repeater throughput (or the average AP-repeater throughput) and the AP-client throughput (or the AP-client throughput) associated with each of the client stations 206 and 208 in the access point throughput table. The flow continues at block 512.

At block 512, the access point switches to a client mode and causes the wireless repeater to determine the repeater-client throughput associated with each of the one or more client stations. For example, after the access point throughput table is generated, the repeater position analysis unit 204 can provide a control message to the wireless repeater 210 to cause the wireless repeater 210 to switch from a client mode to an access point mode. The repeater position analysis unit 204 can then cause the access point 202 to switch to the client mode. After the access point 202 switches to the client mode, the client stations 206 and 208 previously associated with the access point 202 can disassociate from the access point 202. The client stations 206 and 208 can then associate with the wireless repeater 210 that is configured in the access point mode. As will further be described with reference to FIGS. 7-8, after switching to the access point mode, the wireless repeater 210 can determine the repeater-client throughput associated with each of the client stations 206 and 208 in the wireless communication network 200. The flow continues at block 514.

At block 514, a repeater throughput table comprising the repeater-client throughput associated with each of the one or more client stations is received. For example, the repeater position analysis unit 204 can receive, from the wireless repeater 210, the repeater throughput table comprising the repeater-client throughput associated with each of the client stations 206 and 208. Operations of the wireless repeater 210 determining the repeater-client throughput and determining the repeater throughput table will be further described below in FIGS. 7-8. The flow continues at block 515.

At block 515, the access point switches from the client mode to the access point mode. For example, on receiving the repeater throughput table, the repeater position analysis unit 204 can cause the access point 202 to switch to the access point mode. Furthermore, on receiving the repeater throughput table, the access point 202 can transmit another control message to the wireless repeater 210 to cause the wireless repeater 210 to switch back to the client mode. After the access point 202 switches to the access point mode, the client stations 206 and 208 previously associated with the wireless repeater 210 can disassociate from the wireless repeater 210. The client stations 206 and 208 can then associate with the access point 202 that is configured in the access point mode. The flow continues at block 516 in FIG. 6.

At block 516, a loop begins for each of the one or more client stations in the wireless communication network. For example, the repeater position analysis unit 204 can initiate a loop to analyze each of the client stations 206 and 208 in the wireless communication network 200. As will be further described below with reference to blocks 518-526, based on the repeater throughput table and the access point throughput table, the repeater position analysis unit 204 can determine whether a direct connection with each client station or a 1-hop connection with each client station via the wireless repeater 210 yields the best throughput. The flow continues at block 518.

At block 518, an AP-repeater-client throughput (cumulative throughput) is calculated based on the AP-repeater throughput and the repeater-client throughput. For example, the repeater position analysis unit 204 can calculate the AP-repeater-client throughput based on the AP-repeater throughput (determined at block 508) and the repeater-client throughput (received in the repeater throughput table at block 514). The AP-repeater-client throughput for the client station 206 can be representative of the throughput achieved on the wireless communication link between the access point 202 and the client station 206 via the wireless repeater 210. In some implementations, the repeater position analysis unit 204 can calculate the AP-repeater-client throughput in accordance with Eq. 4. In other implementations, the repeater position analysis unit 204 can calculate the AP-repeater-client throughput in accordance with Eq. 5, which is a simplified variant of Eq. 4. The flow continues at block 520.

$$AP\_repeater\_client\ througput = \frac{(AP\_repeater\ throughput) * (repeater\_client\ throughput)}{(AP\_repeater\ throughput) + (repeater\_client\ throughput)} \quad \text{Eq. 4}$$

$$AP\_repeater\_client\ througput = \frac{1}{2} * \min(AP\_repeater\ throughput, repeater\_client\ throughput) \quad \text{Eq. 5}$$

At block 520, it is determined whether the AP-client throughput is greater than the AP-repeater-client throughput. For example, the repeater position analysis unit 204 can determine whether the AP-client throughput is greater than the AP-repeater-client throughput. In other words, the repeater position analysis unit 204 can determine whether directly communicating with the client station 206 will yield a better performance than communicating with the client station 206 via the wireless repeater 210. In some implementations, the repeater position analysis unit 204 may simply determine whether the AP-client throughput is greater than the AP-repeater-client throughput to determine whether the client station 206 should connect to the access point 202 via a direct connection or via the wireless repeater 210. In another implementation, the repeater position analysis unit 204 may determine whether the AP-repeater-client throughput is greater than the AP-client throughput by a predetermined margin (e.g., by 25%) to determine whether the client station 206 should connect to the access point 202 via a direct connection or via the wireless repeater 210. The predetermined margin can be configurable and can be selected to maintain a balance between decrease in communication bandwidth if the client station 206 connects to the access point 202 via the wireless repeater 210 and a corresponding increase in throughput. In one example, the predetermined margin can be selected to be 25%. In another example, the predetermined margin can be selected to be 15%. In determining whether the client station 206 should connect to the access point 202 via a direct connection or via the wireless repeater 210, the repeater position analysis unit 204 may also take available communication bandwidth and the performance requirements associated with the client station 206, the access point 202, and the wireless repeater 210 into consideration. If it is determined that the AP-client throughput is greater than the AP-repeater-client throughput, the flow continues at block 522. Otherwise, the flow continues at block 524.

At block 522, it is indicated in an access point association table that the client station should associate directly with the access point. The flow 500 moves from block 520 to block 522 if the repeater position analysis unit 204 determines that the AP-client throughput associated with the client station is greater than the AP-repeater-client throughput associated with the same client station. The access point association table can comprise a list of client stations with which the access point 202 can associate (e.g., on receiving an association request message from the client stations). The access point 202 can block all other client stations (not listed within the access point association table) that have a higher AP-repeater-client throughput as compared to the AP-client throughput. For example, the repeater position analysis unit 204 can indicate, in the access point association table, that the client station 206 should associate directly with the access point 202. Thus, the access point 202 can associate with the client station 206 in response to receiving an association request message from the client station 206. However, in response to receiving an association request message from the client station 208, the access point 202 can transmit an association denied message and can prevent association with the client station 208. The flow continues at block 526.

At block 524, it is indicated in a repeater association table that the client station should connect to the access point via the wireless repeater. The flow 500 moves from block 520 to block 524 if the repeater position analysis unit 204 determines that the AP-client throughput is not greater than the AP-repeater-client throughput. The repeater association table can comprise a list of client stations with which the wireless repeater 210 can associate (e.g., on receiving an association request message from the client stations). For example, the repeater position analysis unit 204 can indicate, in the repeater association table, that the wireless repeater 210 should associate with the client station 208. The flow continues at block 526.

At block 526, it is determined whether additional client stations in the wireless communication network are to be analyzed. For example, the repeater position analysis unit 204 can determine whether additional client stations are to be analyzed. If it is determined that additional client stations in the wireless communication network 200 are to be analyzed, the flow continues at block 516 where a next client station is identified and operations described above with reference to blocks 518-526 are executed for the next client station. Otherwise, the flow continues at block 528.

At block 528, an indication of the repeater association table is provided to the wireless repeater. For example, the repeater position analysis unit 204 can provide the repeater association table to the wireless repeater 210. As will be described with reference to FIG. 8, the wireless repeater 210 can associate with the client stations that are included in the repeater association table. The flow continues at block 530.

At block 530, client stations identified in the access point association table are permitted to associate with the access point. For example, as described above, the access point can permit client stations identified in the access point association table to associate with the access point (e.g., the access point can transmit association response messages) and can block client stations that are not identified in the access point association table. From block 530, the flow ends.

It is noted that in some implementations, the repeater position analysis unit 204 can determine whether the AP-repeater-client throughput and the AP-client throughput are greater than the predetermined throughput threshold, as described with reference to block 320 of FIG. 4. If only one of the AP-repeater-client throughput or the AP-client throughput is greater than the predetermined throughput threshold, the repeater position analysis unit 204 can select the wireless communication link that yields the throughput that is greater than the predetermined throughput threshold. For example, if the repeater position analysis unit 204 determines that the AP-repeater-client throughput is greater than the predetermined throughput threshold and that the AP-client throughput is less than the predetermined throughput threshold, the repeater position analysis unit 204 can indicate that the client station 206 should connect to the access point 202 via the wireless repeater 210. However, if both the AP-repeater-client throughput and the AP-client throughput are greater than the predetermined throughput threshold, the repeater position analysis unit 204 can execute operations described with reference to block 520-524 of FIG. 6. Furthermore, in some implementations if the AP-repeater-client throughput and the AP-client throughput are both less than the predetermined throughput threshold, the repeater position analysis unit 204 can indicate that performance requirements associated with the client station 206 cannot be satisfied. Then, the repeater position analysis unit 204 can prompt the network administrator to move the wireless repeater 210 to another position for subsequent analysis of the suitability of the new position of the wireless repeater 210.

FIG. 7 and FIG. 8 depict a flow diagram 700 illustrating example operations of the wireless repeater that operates in conjunction with the access point for analyzing the suitability of the current position of the wireless repeater in a wireless communication network. The flow 700 begins at block 702 in FIG. 7.

At block 702, the wireless repeater is initialized in the client mode and is associated with an access point of a wireless communication network. For example, with reference to FIG. 2, after the wireless repeater 210 is powered on, the wireless repeater 210 can initialize in the client mode. The wireless repeater 210 can detect and associate with the access point 202 of the wireless communication network 200. The flow continues at block 704.

At block 704, a training packet is received from the access point. For example, the repeater position analysis unit 212 of the wireless repeater 210 can receive the training packet from the access point 202. It is noted that, in some implementations, the repeater position analysis unit 212 can receive more than one training packet from the access point 202 during different time intervals. The flow continues at block 706.

At block 706, an acknowledgement message is transmitted to the access point in response to receiving the training packet. For example, the repeater position analysis unit 212 can transmit the acknowledgement message (e.g., an ACK packet) to the access point 202 to indicate successful receipt of the training packet at the wireless repeater 210. In one implementation, if the repeater position analysis unit 212 receives more than one training packet from the access point 202, the repeater position analysis unit 212 can transmit a separate acknowledgment message to indicate receipt of each training packet. In another implementation, if the repeater position analysis unit 212 receives more than one training packet from the access point 202, the repeater position analysis unit 212 can transmit one or more block acknowledgment messages (e.g., a block ACK packet) to indicate receipt of multiple training packets. The flow continues at block 708.

At block 708, an indication to calculate the repeater-client throughput is received from the access point. For example, the repeater position analysis unit 212 can receive a control message from the corresponding repeater position analysis unit 204 of the access point 202 instructing the wireless repeater 210 to change from a client mode to an access point mode. The access point 202 can also prompt the repeater position analysis unit 212 to calculate the repeater-client throughput associated with each of the client stations 206 and 208 in the wireless communication network 200. The flow continues at bock 710.

At block 710, the wireless repeater switches to the access point mode and associates with the one or more client stations of the wireless communication network. For example, in response to receiving the indication to calculate the repeater-client throughput at block 708, the wireless repeater 210 can switch from the client mode to the access point mode. When configured in the access point mode, the wireless repeater 210 can associate with the client stations 206 and 208 of the wireless communication network 200. As described above, the wireless repeater 210 can also associate with the access point 202, after the access point 202 switches from the access point mode to the client mode. The flow continues at block 712.

At block 712, the repeater-client throughput is calculated for each of the one or more client stations associated with the wireless repeater. For example, the repeater position analysis unit 212 can calculate the repeater-client throughput associated with the client stations 206 and 208. As described above with reference to blocks 310-316 of FIGS. 3 and 4, the repeater position analysis unit 212 can transmit one or more training packets to the client stations 206 and 208 and can receive acknowledgement messages from the client stations 206 and 208. The repeater position analysis unit 212 can determine performance measurements associated with the received acknowledgement messages. Consequently, the repeater position analysis unit 212 can calculate the repeater-client throughput associated with each of the client stations 206 and 208 based on the determined performance measurements (e.g., by using Eq. 1 shown above). The flow continues at block 714 in FIG. 8.

At block 714, a repeater throughput table is populated with the repeater-client throughput associated with each of the one or more client stations. For example, the repeater position analysis unit 212 can store the repeater-client throughput associated with the client stations 206 and 208 in the repeater throughput table. The flow continues at block 716.

At block 716, the repeater throughput table is provided to the access point. For example, the repeater position analysis unit 212 can transmit the repeater throughput table to the access point 202. As described above, with reference to FIGS. 5-6, the access point 202 can use the repeater throughput table in conjunction with the access point throughput table to analyze the suitability of the current position of the wireless repeater 210, and to determine whether the client stations 206 and 208 should directly connect to the access point 202 or should connect to the access point 202 via the wireless repeater 210. The flow continues at block 718.

At block 718, the wireless repeater switches from the access point mode to the client mode. In one implementation, the repeater position analysis unit 212 can receive a control message from the access point 202 instructing the wireless repeater 210 to switch from the access point mode to the client mode. Consequently, the repeater position analysis unit 212 can cause the wireless repeater 210 to switch to the client mode. In another implementation, the repeater position analysis unit 212 can cause the wireless repeater 210 to switch to the client mode as soon as the repeater throughput table is provided to the access point 202. In another implementation, the repeater position analysis unit 212 can wait to receive an acknowledgement message that indicates receipt of the repeater throughput table at the access point 202. The repeater position analysis unit 212 can retransmit the repeater throughput table if the acknowledgment message is not received. In some implementations, the repeater position analysis unit 212 can abort operations for analyzing the suitability of the current position of the wireless repeater 210 if the acknowledgement message is not received within a predetermined timeout interval and/or after a predetermined number of retransmission attempts. Consequently, the repeater position analysis unit 212 can cause the wireless repeater 210 to switch to the client mode. The flow continues at block 720.

At block 720, a repeater association table is received from the access point. For example, the repeater position analysis unit 212 can receive the repeater association table from the access point 202. The repeater association table can comprise a list of client stations with which the wireless repeater 210 can associate (e.g., in response to receiving an association request message from the client stations). As described above, the client stations identified in the repeater association table are associated with an AP-repeater-client throughput that is greater than the AP-client throughput. The flow continues at block 722.

At block 722, an acknowledgement message indicating receipt of the repeater association table is transmitted to the access point. For example, the repeater position analysis unit 212 can transmit (to the access point 202) the acknowledgement message indicating receipt of the repeater association table. The flow continues at block 724.

At block 724, the wireless repeater associates with client stations indicated in the repeater association table. The wireless repeater 210 can switch from the client mode to a repeater mode and can permit client stations identified in the repeater association table to associate with the wireless repeater 210. The wireless repeater 210 can block (and prevent association with) all other client stations (not listed on the repeater association table) that have a higher AP-client throughput as compared to the AP-repeater-client throughput. For example, the repeater association table may indicate that the client station 208 should connect to the access point 202 via the wireless repeater 210. Thus, the wireless repeater 210 can associate with the client station 208 in response to receiving an association request message from the client station 208. However, if an association request message is received from the client station 206, the wireless repeater 210 can transmit an association denied message, can prevent association with the client station 206, and/or can cause the client station 206 to directly connect to and associate with the access point 202. From block 724, the flow ends.

In some implementations, finite state machines can be implemented on the access point 202 and on the wireless repeater 210 to facilitate the exchange of throughput tables, association tables, and other control messages between the access point 202 and the wireless repeater 210. The timing diagram 900 of FIG. 9 illustrates example messages exchanged between the access point 202 and the wireless repeater 210 for analyzing the suitability of the current position of the wireless repeater 210.

Figure 9:
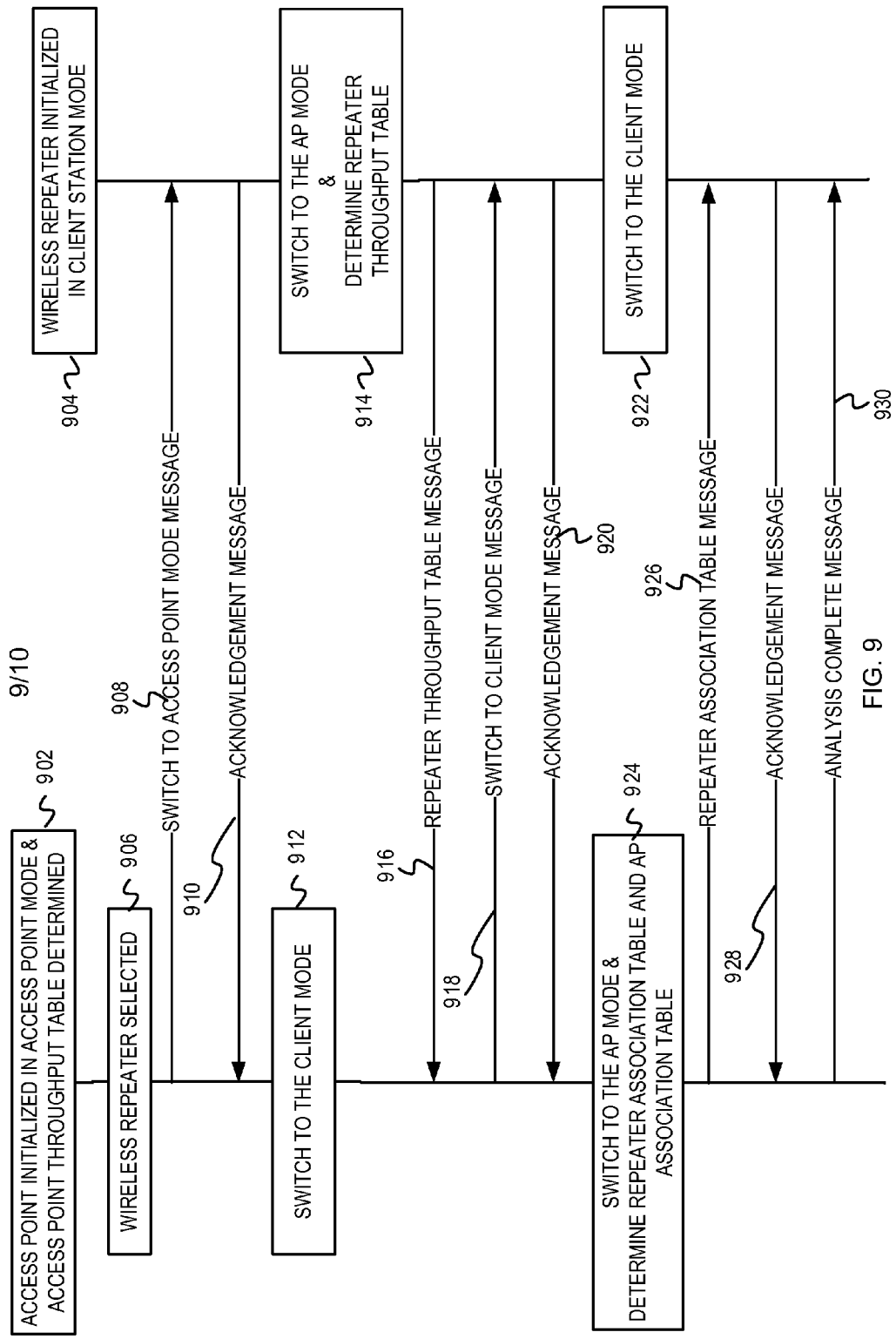
FIG. 9 is an example timing diagram 900 illustrating a mechanism for analyzing the suitability of the position of a wireless repeater in a wireless communication network.

FIG. 9 is an example timing diagram 900 illustrating a mechanism for analyzing the suitability of the position of the wireless repeater 210 in the wireless communication network 200. After the access point 202 and the wireless repeater 210 are powered on, the access point 202 initializes in the access point mode (depicted in state 902), while the wireless repeater 210 initializes in the client mode (depicted in state 904). The wireless repeater 210 and other client stations (not shown in the timing diagram 900) associate with the access point 202. As depicted by the state 902, the access point 202 calculates the access point throughput table (described above with reference to blocks 506-510 of FIG. 5). At state 906, the access point 202 identifies and selects the wireless repeater 210. The access point 202 transmits a control message 908 directing the wireless repeater 210 to switch from the client mode to the access point mode. The wireless repeater 210 transmits the acknowledgment message 910 in response to receiving the control message 908. It is noted that if the access point 202 does not receive the acknowledgment message 910, the access point 202 can retransmit the control message 908 until it receives the acknowledgment message 910 or until a predetermined timeout duration elapses. After the predetermined timeout duration elapses, the access point 202 can abort operations for analyzing the suitability of the current position of the wireless repeater 210 and can remain in the access point mode.

After the access point 202 receives the acknowledgment message 910, the access point 202 switches to the client mode as depicted in state 912. As depicted by state 914, the wireless repeater 210 switches to the access point mode. The access point 202 in the client mode (and the other client stations) associates with the wireless repeater 210 configured in the access point mode. At state 914, the wireless repeater 210 also determines the repeater throughput table as described above with reference to blocks 712-714 of FIG. 6-7. The wireless repeater 210 transmits (to the access point 202) a message 916 comprising the repeater throughput table. The access point 202 transmits another control message 918 directing the wireless repeater 210 to switch from the access point mode to the client mode. The wireless repeater 210 transmits the acknowledgment message 920 in response to receiving the control message 918. As described above, in some implementation, the access point 202 can retransmit the control message 918 if the access point 202 does not receive the acknowledgment message 920. In other implementations, the access point 202 can abort operations for analyzing the suitability of the current position of the wireless repeater 210 and switch to the access point mode if the acknowledgment message 920 is not received before the predetermined timeout interval elapses.

After the access point 202 receives the acknowledgment message 920, the access point 202 switches to the access point mode as depicted in state 924. The wireless repeater 210 also switches to the client mode as depicted by state 922. As depicted by the state 924, the access point 202 also analyses the access point throughput table and the repeater throughput table and determines an access point association table and a repeater association table, as described above with reference to blocks 520-524 of FIG. 6. The access point 202 transmits (to the wireless repeater 210) a message 926 comprising the repeater association table. The wireless repeater 210 acknowledges receipt of the repeater association table by transmitting an acknowledgement message 928 to the access point. Finally, the access point 202 transmits an analysis complete message 930 to the wireless repeater 210 to indicate that analysis of the suitability of the current position of the wireless repeater 210 is completed.

It should be understood that FIGS. 1-9 are examples meant to aid in understanding embodiments and should not be used to limit embodiments or limit scope of the claims. Embodiments may perform additional operations, fewer operations, operations in a different order, operations in parallel, and some operations differently. For example, although FIG. 2 and FIGS. 5-9 describe the access point 202 analyzing the suitability of the current position of the wireless repeater and determining whether the client stations 206 and 208 should directly connect to the access point 202 (or should connect to the access point 202 via the wireless repeater 210), embodiments are not so limited. In other embodiments, the wireless repeater 210 can implement functionality for analyzing the suitability of the current position of the wireless repeater 210 and for determining whether the client stations 206 and 208 should connect to the access point 202 directly or via the wireless repeater 210. In this embodiment, the access point 202 may determine the access point throughput table as described above and may provide an indication of the access point throughput table to the wireless repeater 210. The wireless repeater 210, in turn, may determine and compare the AP-repeater-client throughput with the AP-client throughput. The wireless repeater 210 may also determine and indicate (to the access point 202) the client stations with which the access point 202 should associate and the client stations with which the wireless repeater 210 should associate. Furthermore, in some implementations, functionality for analyzing the suitability of the current position of the wireless repeater 210 and for determining whether the client stations 206 and 208 should connect to the access point 202 directly or via the wireless repeater 210 may be implemented on a standalone network maintenance unit. The network maintenance unit can receive an indication of the access point throughput table from the access point 202 and an indication of the repeater throughput table from the wireless repeater 210 and can accordingly determine the access point association table and the repeater association table (similarly as was described above).

Although not described with reference to FIGS. 5-9, in some implementations, in response to determining that the AP-repeater-client throughput exceeds the AP-client throughput, the repeater position analysis unit 204 of the access point 202 can determine whether the AP-repeater-client throughput also exceeds the predetermined throughput threshold to determine whether the current position of the wireless repeater 210 satisfies performance requirements, as described above with reference to FIGS. 3-4. If it is determined that at its current position the wireless repeater 210 satisfies performance requirements associated with the client station, the repeater position analysis unit 204 can indicate success of the current position of the wireless repeater 210 with respect to the client station. Otherwise, the repeater position analysis unit 204 can indicate failure of the current position of the wireless repeater 210 with respect to the client station. In other implementations, however, the repeater position analysis unit 212 of the wireless repeater 210 can execute operations described above with reference to FIGS. 3-4 to determine the suitability of the current position of the wireless repeater 210 with respect to each of the client stations.

Furthermore, in some implementations, the repeater position analysis unit 204 can indicate success/failure of the current position of the wireless repeater 210 with respect to the client stations 206 and 208 using LEDs or a display unit. The success/failure of the current position of the wireless repeater 210 can be displayed on the wireless repeater 210, the access point 202, and/or an externally connected computer system/display unit. For example, repeater position analysis unit 204 may not switch on the LED associated with the client station 208 in response to determining that the wireless repeater 210 does not satisfy the performance requirements for the client station 208 (i.e., on determining that both the AP-repeater-client throughput and the AP-client throughput are less than the predetermined throughput threshold). As another example, the repeater position analysis unit 204 can display the address, the AP-repeater-client throughput, and success of the current position of the wireless repeater 210 with respect to the client station 208 on the display unit (e.g., an LCD display), in response to determining that the AP-repeater-client throughput is greater than the AP-client throughput and that the client station 208 should associate with the wireless repeater 210

Although FIGS. 1-9 depict the repeater position analysis unit analyzing the suitability of the current position of the wireless repeater with respect to all the client stations in the wireless communication network, embodiments are not so limited. In other embodiments, the repeater position analysis unit may analyze the suitability of the current position of the wireless repeater with respect to only a subset of the client stations in the wireless communication network. For example, with reference to FIG. 1, the repeater position analysis unit 112 may determine to analyze the suitability of the current position of the wireless repeater 104 with respect to the client station 108 (and not the client station 106). Furthermore, in some implementations, the repeater position analysis unit 112 can also implement the operations described herein to determine the best position (e.g., in terms of X and Y coordinates, height, orientation) at which to place the wireless repeater 104. The repeater position analysis unit 112 can determine the AP-repeater-client throughputs associated with each of the client stations 106 and 108 at different positions of the wireless repeater 104. The repeater position analysis unit 112 can identify the position of the wireless repeater 104 that yields the best throughput for all the client stations 106 and 108 in the wireless communication network.

Although FIG. 3 depicts the traffic generation unit 114 transmitting one training packet to the client stations 106 and 108 and the access point 102 to determine the repeater-client throughput and the repeater-AP throughput respectively, embodiments are not so limited. In other embodiments, the traffic generation unit 114 can transmit any suitable number of training packets to determine the repeater-client throughput and the repeater-AP throughput. The traffic generation unit 114 can transmit multiple training packets over a programmable number of time intervals to guard against variations in PHY rate, PER, and other performance measurements due to attenuation, distortion and other interference effects. The number of time intervals can be determined to maintain an optimal balance between the total time required to analyze the suitability of the current position of the wireless repeater 104 and the accuracy of the wireless repeater 104. In one implementation, the traffic generation unit 114 can receive an acknowledgement message for each of the transmitted training packets. The performance analysis unit 116 can determine the PHY rate and the PER associated with each of the received acknowledgement messages and can calculate the corresponding repeater-client throughput (or the repeater-AP throughput). The performance analysis unit 116 can calculate an average repeater-client throughput (or an average repeater-AP throughput) over the programmable number of time intervals. In another implementation, the traffic generation unit 114 can receive one acknowledgement message for multiple transmitted training packets (e.g., 1 block acknowledgement message per 10 transmitted training packets). Based on the number of block acknowledgement messages received, the performance analysis unit 116 can calculate the repeater-client throughput (and the repeater-AP throughput) or the average repeater-client throughput (and the average repeater-AP throughput). The performance analysis unit 116 can then use the calculated throughput values to determine the suitability of the current position of the wireless repeater 104, as described with reference to FIGS. 3-4.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (e.g., a personal computer, mobile phone, television set-top box, or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
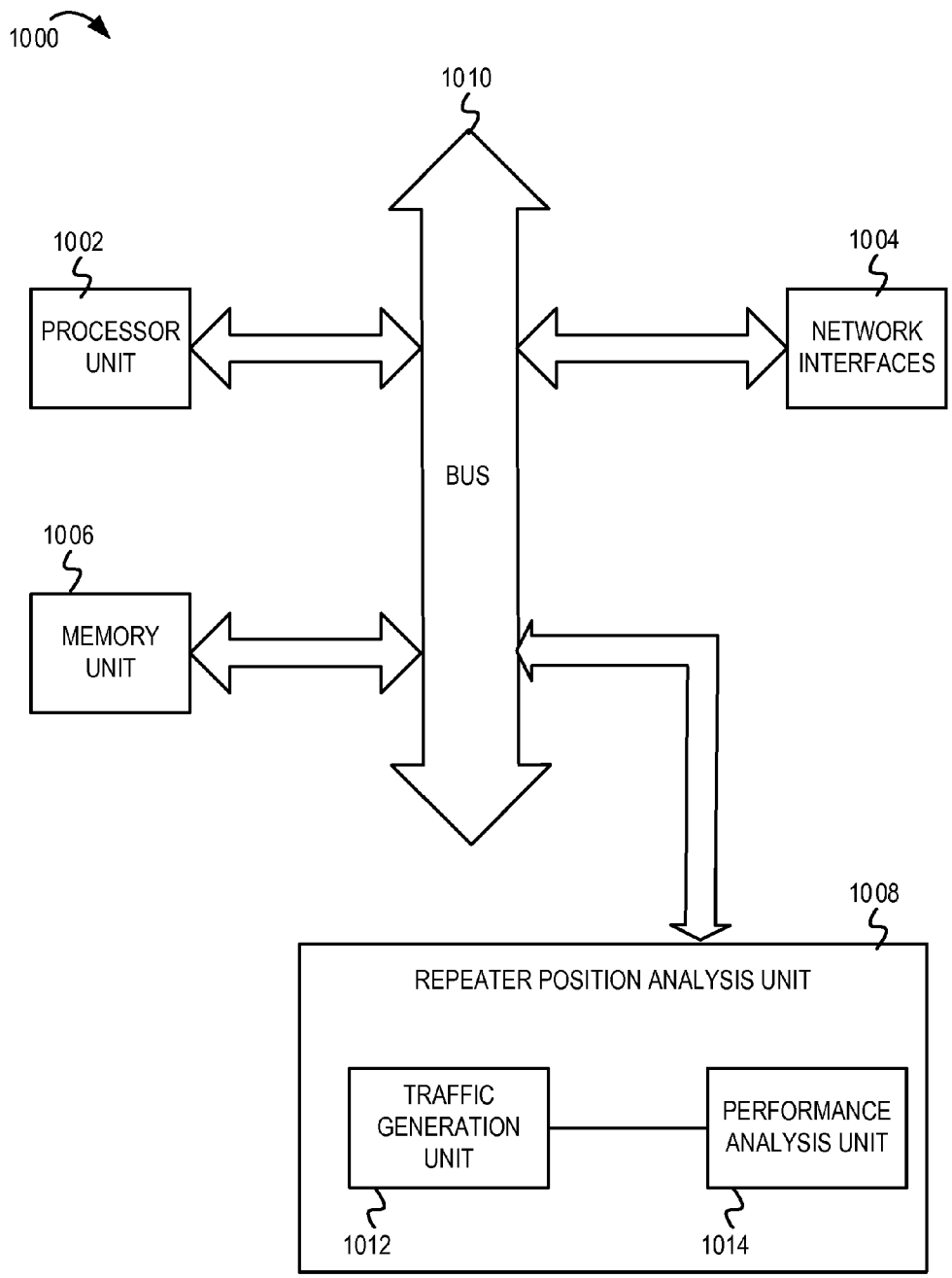
FIG. 10 is a block diagram of one embodiment of an electronic device including a mechanism for analyzing the suitability of the position of a wireless repeater in a wireless communication network.

FIG. 10 is a block diagram of one embodiment of an electronic device 1000 including a mechanism for analyzing the suitability of the position of a wireless repeater in a wireless communication network. In some implementations, the electronic device 1000 may be one of a personal computer (PC), a laptop, a tablet computer, a mobile phone, a television set-top box, a personal digital assistant (PDA), or other electronic systems comprising a WLAN device configured as an access point. In another implementation, the electronic device 1000 can be a standalone WLAN access point configured to establish a WLAN communication link with a wireless repeater and one or more WLAN client devices. In another implementation, the electronic device 1000 may be one of a personal computer (PC), a laptop, a tablet computer, a mobile phone, a television set-top box, a personal digital assistant (PDA), or other electronic systems comprising a WLAN device configured as a wireless repeater. In another implementation, the electronic device 1000 can be a standalone wireless repeater configured to establish a WLAN communication link with an access point and one or more WLAN client devices to extend the range of the access point.

The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 1000 also includes a repeater position analysis unit 1008. The repeater position analysis unit 1008 comprises a traffic generation unit 1012 and a performance analysis unit 1014. The repeater position analysis unit 1008 can implement operations described above with reference to FIG. 1 and FIGS. 3-4, when the electronic device 1000 comprises a wireless repeater configured for analyzing the suitability of the position of the wireless repeater. The repeater position analysis unit 1008 can implement operations described above with reference to FIGS. 2, 5, 6, and 9, when the electronic device 1000 comprises an access point configured for analyzing the suitability of the position of the wireless repeater. When the electronic device 1000 comprises the access point, the wireless repeater (which may also be implemented as the electronic device 1000 of FIG. 10) can implement operations described above with reference to FIGS. 7-9. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1006 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for placement of wireless repeaters in a wireless communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a wireless repeater, a repeater-to-access point (repeater-AP) throughput associated with a first communication link between the wireless repeater and an access point associated with a wireless communication network based, at least in part, on a performance measurement for a first plurality of training packets transmitted between the wireless repeater and the access point;
    for a client station associated with the wireless communication network,
        determining, at the wireless repeater, a repeater-client throughput associated with a second communication link between the wireless repeater and the client station based, at least in part, on a performance measurement for a second plurality of training packets transmitted between the wireless repeater and the client station;
    determining an AP-repeater-client throughput between the access point and the client station via the wireless repeater, the AP-repeater-client throughput based, at least in part, on a minimum throughput value associated with the repeater-AP throughput and the repeater-client throughput; and
    indicating whether a current position of the wireless repeater can meet a predetermined performance requirement with respect to the client station based, at least in part, on whether the AP-repeater-client throughput is greater than or equal to the predetermined throughput threshold.

2. The method of claim 1, wherein determining the repeater-AP throughput comprises:
    transmitting the first plurality of training packets from the wireless repeater to the access point;
    receiving an acknowledgement message from the access point in response to transmitting the first plurality of training packets from the wireless repeater to the access point;
    analyzing the acknowledgement message to determine the performance measurement associated with the first communication link; and
    determining the repeater-AP throughput based, at least in part, on the performance measurement associated with the first communication link.

3. The method of claim 2, wherein the performance measurement comprises one or more of:
    a data rate associated with the acknowledgement message received from the access point,
    a packet error rate associated with the acknowledgement message and
    a packet overhead associated with the first plurality of training packets and the message.

4. The method of claim 2, wherein determining the repeater-AP throughput based, at least in part, on the performance measurement associated with the first communication link comprises determining a goodput associated with the first communication link based, at least in part, on:
    a data rate associated with the acknowledgement message received from the access point,
    a packet error rate associated with the acknowledgement message, and
    a packet overhead associated with the first plurality of training packets and the acknowledgement message.

5. The method of claim 1, wherein determining the repeater-AP throughput comprises:
    transmitting the first plurality of training packets from the wireless repeater to the access point within a predetermined number of time intervals;
    receiving a plurality of acknowledgement messages from the access point in response to transmitting the first plurality of training packets from the wireless repeater to the access point within the predetermined number of time intervals;
    for each of the plurality of acknowledgement messages,
        analyzing the acknowledgement messages to determine a performance measurement associated with the first communication link;

determining an intermediate throughput associated with the first communication link based, at least in part, on the or more performance measurements associated with the first communication link between the wireless repeater and the access point; and determining an average of the intermediate throughputs determined for the plurality of acknowledgement messages to yield the repeater-AP throughput.

6. The method of claim 1, wherein determining the repeater-client throughput comprises:

transmitting the second plurality of training packets from the wireless repeater to the client station;

receiving an acknowledgement message from the client station in response to transmitting the second plurality of training packets from the wireless repeater to the client station;

analyzing the acknowledgement message to determine the performance measurement associated with the second communication link; and determining the repeater-client throughput based, at least in part, on the performance measurement associated with the second communication link.

7. The method of claim 1, wherein determining the AP-repeater-client throughput comprises:

calculating a product of the repeater-AP throughput and the repeater-client throughput;

calculating a sum of the repeater-AP throughput and the repeater-client throughput; and dividing the calculated product by the calculated sum to determine the AP-repeater-client throughput.

8. The method of claim 1, wherein determining the AP-repeater-client throughput comprises:

determining the minimum throughput value from between with the repeater-AP throughput and the repeater-client throughput; and multiplying the determined minimum throughput value by a predetermined scale factor to yield the AP-repeater-client throughput.

9. A method comprising determining, at an access point, an access point-to-repeater (AP-repeater) throughput associated with a first communication link between the access point and a wireless repeater associated with a wireless communication network based, at least in part, on a performance measurement for a first plurality of training packets transmitted between the access point and the wireless repeater;

determining, at the access point, an AP-client throughput associated with a direct communication link between the access point a client station based at least in part, on a performance measurement for a second plurality of training packets transmitted between the access point and the client station;

determining a repeater-client throughput associated with a second communication link between the wireless repeater and the client station;

determining an AP-repeater-client throughput of a third communication link between the access point and the client station via the wireless repeater, the AP-repeater-client throughout based, at least in part, on the AP-repeater throughput and the repeater-client throughput;

determining whether the AP-repeater-client throughput exceeds the AP-client throughput;

causing the client station to establish the direct communication link with the access point, in response to determining that the AP-repeater-client throughput does not exceed the AP-client throughput; and causing the client station to establish the third communication link with the access point via the wireless repeater, in response to determining that the AP-repeater-client throughput exceeds the AP-client throughput.

10. The method of claim 9, further comprising:

receiving, from the wireless repeater at the access point, an indication of the repeater-client throughput.

11. The method of claim 9, wherein determining the AP-repeater throughput comprises:

transmitting the first plurality of training packets from the access point to the wireless repeater;

receiving an acknowledgement message from the wireless repeater in response to transmitting the first plurality of training packets from the access point to the wireless repeater;

analyzing the acknowledgement message to determine the performance measurement associated with the first communication link; and determining the AP-repeater throughput based, at least in part, on the performance measurement associated with the first communication link.

12. The method of claim 9, wherein determining the AP-client throughput comprises:

transmitting the second plurality of training packets from the access point to the client station;

receiving an acknowledgement message from the client station in response to transmitting the second plurality of training packets from the access point to the client station;

analyzing the acknowledgement message to determine the performance measurement associated with the direct communication link; and determining the AP-client throughput based, at least in part, on the performance measurement associated with the direct communication link.

13. The method of claim 9, wherein determining whether the AP-repeater-client throughput exceeds the AP-client throughput comprises:

determining whether the AP-repeater-client throughput exceeds the third throughput by a predefined margin.

14. The method of claim 9, wherein causing the client station to establish the third communication link with the access point via the wireless repeater further comprises:

indicating, in a wireless repeater association data structure, that the client station should establish the third communication link with the access point via the wireless repeater in response to determining that the AP-repeater-client throughput exceeds the AP-client throughput; and providing, from the access point to the wireless repeater, the wireless repeater association data structure to cause the wireless repeater to prevent association with another client station not indicated within the wireless repeater association data structure.

15. The method of claim 9, wherein causing the client station to establish the direct communication link with the access point further comprises:

preventing association of the access point with another client station not indicated within an access point association data structure, wherein the access point association data structure comprises an indication of client stations that should establish the direct communication link with the access point; and associating with the client stations indicated within the access point association data structure.

16. The method of claim 9, wherein determining the repeater-client throughput comprises:

providing, from the access point to the wireless repeater, a control message to cause the wireless repeater to switch from a client mode to an access point mode;

determining whether an acknowledgement message was received at the access point from the wireless repeater, in response to providing the control message to the wireless repeater;

in response to determining that the acknowledgement message was received from the wireless repeater, causing the access point to switch from the access point mode to the client mode; and causing the access point configured in the client mode to associate with the wireless repeater configured in the access point mode;

in response to determining that the acknowledgement message was not received from the wireless repeater, determining whether a timeout interval associated with the acknowledgement message is elapsed, wherein the timeout interval indicates a maximum time duration for which the access point waits to receive the acknowledgement message from the wireless repeater;

retransmitting the control message to the wireless repeater, in response to determining that the timeout interval associated with the acknowledgement message is not elapsed; and aborting operations for analyzing suitability of a current position of the wireless repeater, in response to determining that the timeout interval associated with the acknowledgement message is elapsed.

17. The method of claim 9, wherein in response to determining that the AP-repeater-client throughput exceeds the AP-client throughput, the method further comprises:

determining whether a current position of the wireless repeater can meet a predetermined performance requirement with respect to the client station based, at least in part, on whether the AP-repeater-client throughput is greater than or equal to a predetermined throughput threshold; and indicating whether the current position of the wireless repeater can meet predetermined performance requirements with respect to the client station.

18. A wireless repeater comprising:

a processor;

a network interface coupled with the processor; and a position analysis unit coupled with the processor and with the network interface, the position analysis unit operable to:

determine a repeater-to-access point (repeater-AP) throughput associated with a first communication link between the wireless repeater and an access point associated with a wireless communication network based, at least in part, on a performance measurement for a first plurality of training packets transmitted between the wireless repeater and the access point;

for a client station associated with the wireless communication network, determine a repeater-client throughput associated with a second communication link between the wireless repeater and the client station based, at least in part, on a performance measurement for a second plurality of training packets transmitted between the wireless repeater and the client station;

determine an AP-repeater-client throughput between the access point and the client station via the wireless repeater, the AP-repeater-client throughput based, at least in part, on a minimum throughput value associated with the repeater-AP throughput and the repeater-client throughput; and indicate whether a current position of the wireless repeater can meet a predetermined performance requirement with respect to the client station based, at least in part, on whether the AP repeater-client throughput is greater than or equal to the predetermined throughput threshold.

19. The wireless repeater of claim 18, wherein the position analysis unit operable to determine the repeater-AP throughput further comprises the position analysis unit operable to:

transmit the first plurality of training packets from the wireless repeater to the access point;

receive an acknowledgement message from the access point in response to the position analysis unit transmitting the first plurality of training packets to the access point;

analyze the acknowledgement message to determine the performance measurement associated with the first communication link; and determine the repeater-AP throughput based, at least in part, on the performance measurement associated with the first communication link.

20. The wireless repeater of claim 19, wherein the performance measurement comprises one or more of a data rate associated with the acknowledgement message received from the access point, a packet error rate associated with the acknowledgement message, and a packet overhead associated with the first plurality of training packets and the acknowledgement message.

21. The wireless repeater of claim 18, wherein the position analysis unit operable to determine the repeater-AP throughput further comprises the position analysis unit operable to:

transmit the first plurality of training packets from the wireless repeater to the access point within a predetermined number of time intervals;

receive a plurality of acknowledgement messages from the access point in response to the position analysis unit transmitting the first plurality of training packets from the wireless repeater to the access point within the predetermined number of time intervals;

for each of the plurality of acknowledgement messages, analyze the acknowledgement message to determine the performance measurement associated with the first communication link;

determine an intermediate throughput associated with the first communication link based, at least in part, on the performance measurement associated with the first communication link between the wireless repeater and the access point; and determine an average of the intermediate throughputs determined for the plurality of acknowledgement messages to yield the repeater-AP throughput.

22. The wireless repeater of claim 18, wherein the position analysis unit operable to determine the repeater-client throughput further comprises the position analysis unit operable to:

transmit the second plurality of training packets from the wireless repeater to the client station;

receive an acknowledgement message from the client station in response to the position analysis unit transmitting the second plurality of training packets from the wireless repeater to the client station;

analyze the acknowledgement message to determine the performance measurement associated with the second communication; and determine the repeater-client throughput based, at least in part, on the performance measurement associated with the second communication link.

23. An access point comprising:
a processor;
a network interface coupled with the processor; and
a position analysis unit coupled with the processor and with the network interface, the position analysis unit operable to:
  determine an access point-to-repeater (AP-repeater) throughput associated with a first communication link between the access point and a wireless repeater associated with a wireless communication network;
  determine an AP-client throughput associated with a direct communication link between the access point and a client station associated with the wireless communication network;
  determine a repeater-client throughput associated with a second communication link between the wireless repeater and the client station;
  determine an AP-repeater-client throughput of a third communication link between the access point and the client station via the wireless repeater, the AP-repeater-client throughput based, at least in part, on the AP-repeater throughput and the repeater-client throughput;
  determine whether the AP-repeater-client throughput exceeds the AP-client throughput;
  cause the client station to establish the direct communication link with the access point, in response to the position analysis unit determining that the AP-repeater-client throughput does not exceed the AP-client throughput; and
  cause the client station to establish the third communication link with the access point via the wireless repeater, in response to the position analysis unit determining that the AP-repeater-client throughput exceeds the AP-client throughput.

24. The access point of claim 23, wherein the position analysis unit operable to determine the AP-repeater-client throughput, further comprises the position analysis unit operable to:
  provide, to the wireless repeater, a control message to cause the wireless repeater to switch from a client mode to an access point mode;
  determine whether an acknowledgement message was received at the access point from the wireless repeater, in response to the position analysis unit providing the control message to the wireless repeater;
  in response to the position analysis unit determining that the acknowledgement message was received from the wireless repeater,
    cause the access point to switch from the access point mode to the client mode; and
    cause the access point configured in the client mode to associate with the wireless repeater configured in the access point mode;
  in response to the position analysis unit determining that the acknowledgement message was not received from the wireless repeater,
    determine whether a timeout interval associated with the acknowledgement message is elapsed, wherein the timeout interval indicates a maximum time duration for which the access point waits to receive the acknowledgement message from the wireless repeater;
  retransmit the control message to the wireless repeater, in response to the position analysis unit determining that the timeout interval associated with the acknowledgement message is not elapsed; and
  abort operations for analyzing suitability of the current position of the wireless repeater, in response to the position analysis unit determining that the timeout interval associated with the acknowledgement message is elapsed.

25. The access point of claim 23, wherein the position analysis unit is further operable to:
  in response to the position analysis unit determining that the AP-repeater-client throughput exceeds the AP-client throughput,
    indicate, in a wireless repeater association data structure, that the client station should establish the third communication link with the access point via the wireless repeater; and
  provide the wireless repeater association data structure to the wireless repeater to cause the wireless repeater to prevent association with at least a subset of other client stations not indicated within the wireless repeater association data structure.

* * * * *